United States Patent
Guo et al.

(10) Patent No.: US 12,101,205 B2
(45) Date of Patent: Sep. 24, 2024

(54) METHOD AND APPARATUS FOR IMPROVING MULTI-USER MULTIPLEXING PERFORMANCE, DEVICE, AND STORAGE MEDIUM

(71) Applicant: HUAWEI TECHNOLOGIES CO., LTD., Guangdong (CN)

(72) Inventors: Senbao Guo, Xi'an (CN); Guibao Li, Xi'an (CN); Chunhui Le, Shanghai (CN); Bo Wang, Xi'an (CN); Heng Qin, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 17/513,666

(22) Filed: Oct. 28, 2021

(65) Prior Publication Data
US 2022/0052881 A1 Feb. 17, 2022

Related U.S. Application Data

(63) Continuation of application No. PCT/CN2020/086711, filed on Apr. 24, 2020.

(30) Foreign Application Priority Data

Apr. 29, 2019 (CN) .......................... 201910355875.6

(51) Int. Cl.
  *H04L 25/02* (2006.01)
  *H04B 7/0452* (2017.01)
  *H04L 5/00* (2006.01)

(52) U.S. Cl.
  CPC ........ *H04L 25/0224* (2013.01); *H04L 5/0048* (2013.01); *H04L 25/025* (2013.01); *H04B 7/0452* (2013.01)

(58) Field of Classification Search
  None
  See application file for complete search history.

(56) References Cited

U.S. PATENT DOCUMENTS

| | | | |
|---|---|---|---|
| 9,197,301 B2 * | 11/2015 | Zhu ...................... | H04B 7/0617 |
| 10,171,217 B2 * | 1/2019 | Brent ................... | H04B 7/0456 |

(Continued)

FOREIGN PATENT DOCUMENTS

| CN | 101360084 A | 2/2009 |
|---|---|---|
| CN | 102006258 A | 4/2011 |

(Continued)

OTHER PUBLICATIONS

NTT Docomo, Discussions on NR SRS, 3GPP TSG RAN WG1 NR Ad-Hoc#2, Qingdao, P.R. China Jun. 27-30, 2017, R1-1711087 (Year: 2017).*

(Continued)

*Primary Examiner* — Jeffrey M Rutkowski
*Assistant Examiner* — Luna Weissberger
(74) *Attorney, Agent, or Firm* — Fish & Richardson P.C.

(57) ABSTRACT

The present disclosure discloses example method, apparatus, and storage medium for improving multi-user multiplexing performance. One example method includes configuring base sequence identifiers by a network device for a plurality of terminals by using radio resource control (RRC) signaling, where there is no orthogonality between base sequences indicated by the base sequence identifiers of the plurality of terminals. Sounding reference signal (SRS) detection is performed on the plurality of terminals based on a quasi-orthogonal sequence, to obtain channel information for sending an SRS by each terminal. Channel prediction is performed based on the channel information of each terminal, to obtain a channel prediction result of each terminal.

15 Claims, 13 Drawing Sheets

(56) References Cited

U.S. PATENT DOCUMENTS

| | | | |
|---|---|---|---|
| 11,228,463 B2* | 1/2022 | Wang | H04L 5/0053 |
| 2014/0269451 A1 | 9/2014 | Papasakellariou et al. | |
| 2015/0085787 A1 | 3/2015 | Ouchi | |
| 2016/0173252 A1* | 6/2016 | Lee | H04B 7/0417 |
| | | | 370/329 |
| 2017/0272177 A1 | 9/2017 | Seyama | |
| 2018/0278450 A1 | 9/2018 | Zarifi et al. | |

FOREIGN PATENT DOCUMENTS

| | | | |
|---|---|---|---|
| CN | 105472745 A | 4/2016 | |
| CN | 108111270 A | 6/2018 | |
| CN | 109150431 A | 1/2019 | |
| EP | 2670060 A2 | 12/2013 | |

OTHER PUBLICATIONS

Huawei, HiSilicon, UL SRS sequence design in NR, 3GPP TSG RAN WG1 Meeting #89, Hangzhou, China May 15-19, 2017, R1-1708171 (Year: 2017).*

Alcatel-Lucent Shanghai Bell, Alcatel-Lucent, "Considerations on TDD specific enhancement for 3D-MIMO," 3GPP TSG RAN WG1 Meeting #80, R1-151773, Belgrade, Serbia, Apr. 20-24, 2015, 2 pages.

LG Electronics, "On SRS design and related operations,"3GPP TSG RAN WG1 Meeting #88bis, R1-1704892, Spokane, USA Apr. 3-7, 2017, 7 pages.

LG Electronics, "On SRS design and related operations," 3GPP TSG RAN WG1 Meeting NR #90, R1-1713159, Prague, Czech Republic, Aug. 21-25, 2017, 8 pages.

NTT Docomo, Inc., "Discussions on Nr Srs," 3GPP TSG RAN WG1 NR Ad-Hoc#2, R1-1711087, Qingdao, P.R. China, Jun. 27-30, 2017, 4 pages.

Office Action issued in Chinese Application No. 201910355875.6 on Mar. 19, 2021, 19 pages (with English translation).

PCT International Search Report and Written Opinion issued in International Application No. PCT/CN2020/086711 on Jul. 24, 2020, 15 pages (with English translation).

Extended European Search Report issued in European Application No. 20799301.5 on May 9, 2022, 16 pages.

Huawei, HiSilicon, "UL SRS sequence design in NR," 3GPP TSG RAN WG1 Meeting #89, R1-1708171, Hangzhou, China, May 15-19, 2017, 10 pages.

Sharma et al., "Performance Analysis of Multi-User MIMO Downlink System in Time-Varying Channels," 2017 17th International Symposium on Communications and Information Technologies (ISCIT), Sep. 25, 2017, 6 pages.

* cited by examiner

64TRX: M=4, N=8, P=2

METHOD AND APPARATUS FOR IMPROVING MULTI-USER MULTIPLEXING PERFORMANCE, DEVICE, AND STORAGE MEDIUM

CROSS-REFERENCE TO RELATED APPLICATIONS

This application is a continuation of International Application No. PCT/CN2020/086711, filed on Apr. 24, 2020, which claims priority to Chinese Patent Application No. 201910355875.6, filed on Apr. 29, 2019. The disclosures of the aforementioned applications are herein incorporated by reference in their entireties.

TECHNICAL FIELD

This application relates to communications technologies, and in particular, to a method and an apparatus for improving multi-user multiplexing performance, a device, and a storage medium.

BACKGROUND

In actual commercial use of multi-antenna time division duplex (TDD) massive multiple-input multiple-output (MIMO), performance degradation caused by user movement is a very challenging problem in multi-user (MU) MIMO. Such degradation is, at first, performance degradation of a mobile user, and then is performance degradation of an entire network.

In a currently used MU-MIMO algorithm, during multi-user pairing, a single-user weight value is first estimated, and then orthogonalization processing is performed by using zero forcing or a method that is based on zero forcing, to obtain a multi-user weight value, namely, a precoding weight value. The foregoing method is very sensitive to channel accuracy. First, the single-user weight value is calculated based on latest sounding reference signal (SRS) information, to obtain a channel. A time interval at which SRS information is sent is relatively long, usually in the order of tens of ms, and a user scheduling period is usually in the order of ms. When a user moves, a channel changes quickly. Consequently, channel information used by the user does not match a current actual channel. This leads to performance degradation of the mobile user. Such performance degradation is first manifested by signal power reduction of a target user resulting from such mismatch. Then, after a zero forcing step, such an error further spreads. In addition to signal power reduction of the target user, an increase in interference from another user to the target user is further caused. With a same SRS period, a higher moving speed indicates a higher degree of inaccuracy. With a same terminal moving speed, a longer SRS period indicates a higher degree of inaccuracy. This further degrades performance of the mobile user.

SUMMARY

Embodiments of this application provide a method and an apparatus for improving multi-user multiplexing performance, a device, and a storage medium, to resolve a problem that an existing MU-MIMO algorithm causes performance degradation of a mobile user.

A first aspect of this application provides a method for improving multi-user multiplexing performance, where the method is applied to a network device, and includes:

configuring base sequence identifiers for a plurality of terminals by using RRC signaling, where there is no orthogonality between base sequences indicated by the base sequence identifiers of all the terminals;

performing SRS detection on the plurality of terminals based on a quasi-orthogonal sequence, to obtain channel information for sending an SRS by each terminal; and performing channel prediction based on the channel information of each terminal, to obtain a channel prediction result.

In a specific implementation, the method further includes:

obtaining a motion status of each terminal based on a channel, at different SRS moments, of the terminal, where the motion status is used to indicate a magnitude of a moving speed of the terminal, and the motion status includes a quasi-stationary state, a low-speed moving state, or a medium/high-speed moving state; and obtaining a weight value of each terminal through calculation based on the channel prediction result of the terminal and the motion status of the terminal.

Further, in a specific implementation, the channel prediction result of the terminal includes an SRS channel eigenvector or weight value, and the obtaining a weight value of each terminal through calculation based on the channel prediction result of the terminal and the motion status of the terminal includes:

if the motion status of the terminal is the quasi-stationary state, performing type-1 space domain and/or time domain filtering on the SRS channel prediction vector or weight value of the terminal;

if the motion status of the terminal is the low-speed moving state, performing type-2 space domain and/or time domain filtering on the SRS channel prediction vector or weight value of the terminal; or if the motion status of the terminal is the medium/high-speed moving state, performing second-moment calculation on the channel of the terminal to generate the weight value of the terminal.

In a specific implementation, the performing type-1 space domain and/or time domain filtering on the SRS channel prediction vector or weight value of the terminal includes:

performing least mean square filtering on an SRS prediction weight value of the terminal based on a subspace distance and a gradient descent method.

In a specific implementation, the performing type-2 space domain and/or time domain filtering on the SRS channel prediction vector or weight value of the terminal includes:

performing filtering on the SRS channel prediction vector or weight value of the terminal based on a Kalman filtering prediction algorithm;

performing filtering on the SRS channel prediction vector or weight value of the terminal based on a normalized least mean square adaptive filtering prediction algorithm;

performing filtering on the SRS channel prediction vector or weight value of the terminal based on a recursive least square RLS prediction algorithm; or performing filtering on the SRS channel prediction vector or weight value of the terminal based on an autoregressive AR filtering prediction algorithm.

In a specific implementation, the performing SRS detection on the plurality of terminals based on a quasi-orthogonal sequence, to obtain channel information for sending an SRS by each terminal includes:

preprocessing a received to-be-processed frequency domain signal that is at an SRS location, and obtaining, based on the preprocessed frequency domain signal, the channel information for sending the SRS by each terminal.

The preprocessing includes at least one of the following processing:

performing, according to a formula (1) $\tilde{y}(n)=w(n)*y(n)$, frequency domain filtering on the received to-be-processed frequency domain signal that is at the SRS location, where $y(n)$ is the frequency domain signal at the SRS location, $w(n)$ is a frequency domain window coefficient, $\tilde{y}(n)$ is a signal obtained through the frequency domain filtering, $n=0, \ldots, N$ is a channel estimation location index, and N is a channel estimation length;

performing, according to a formula (2) $\tilde{y}=w*y$, frequency domain filtering on the received to-be-processed frequency domain signal that is at the SRS location, where y is the frequency domain signal at the SRS location, whose dimension is N×1; w is a frequency domain window coefficient whose dimension is N×N; y is a signal obtained through the frequency domain filtering, whose dimension is N×1; and N is a channel estimation length; or performing, according to a formula (3) $\tilde{y}=\mathcal{F}(y)$, time domain interference cancellation on the received to-be-processed frequency domain signal that is at the SRS location, where y is the to-be-processed frequency domain signal at the SRS location, whose dimension is N×1; $\mathcal{F}()$ is a time domain cancellation transform function; $\tilde{y}$ is a frequency domain signal obtained through the time domain cancellation, whose dimension is N×1; and N is a channel estimation length.

In a specific implementation, the channel information of each terminal includes an SRS frequency domain channel estimation result of some subbands, and the performing channel prediction based on the channel information of each terminal, to obtain a channel prediction result includes:

predicting full SRS bandwidth based on the SRS frequency domain channel estimation result of the some subbands of each terminal and a frequency domain extrapolation manner, to obtain the channel prediction result of the terminal.

In a specific implementation, the performing channel prediction based on the channel information of each terminal, to obtain a channel prediction result includes:

performing channel prediction on an SRS based on the channel information of each terminal and time-frequency-space two-dimensional inter-calibration, to obtain the channel prediction result of the terminal.

In a specific implementation, the configuring base sequence identifiers for a plurality of terminals by using RRC signaling includes:

sending first RRC signaling to each terminal, where the first RRC signaling carries at least one base sequence identifier; and when a terminal needs to change an SRS base sequence, sending second RRC signaling to the terminal, where the second RRC signaling carries an index identifier, and the index identifier is used to indicate the terminal to send an SRS by using a first base sequence identifier in the at least one base sequence identifier.

In a specific implementation, the configuring base sequence identifiers for a plurality of terminals by using RRC signaling includes:

sending first RRC signaling to each terminal, where the first RRC signaling carries one base sequence identifier, and the base sequence identifier indicates a candidate set of all SRS base sequence identifiers.

A second aspect of this application provides a method for improving multi-user multiplexing performance, where the method is applied to a terminal, and includes:

obtaining a base sequence identifier that is configured by a network device by using RRC signaling, where there is no orthogonality between a base sequence indicated by the base sequence identifier and a base sequence used by another terminal; and sending a sounding reference signal SRS based on the base sequence identifier.

In a specific implementation, the obtaining a base sequence identifier that is configured by a network device by using RRC signaling includes:

receiving first RRC signaling sent by the network device, where the first RRC signaling carries at least one base sequence identifier;

receiving second RRC signaling sent by the network device, where the second RRC signaling carries an index identifier; and determining, based on the index identifier, to send the SRS by using a first base sequence identifier in the at least one base sequence identifier; or receiving first RRC signaling sent by the network device, where the first RRC signaling carries one base sequence identifier.

A third aspect of this application provides an apparatus for improving multi-user multiplexing performance, including:

a sending module, configured to configure base sequence identifiers for a plurality of terminals by using RRC signaling, where there is no orthogonal characteristic between base sequences indicated by the base sequence identifiers of all the terminals; and a processing module, configured to perform SRS detection on the plurality of terminals based on a quasi-orthogonal sequence, to obtain channel information for sending an SRS by each terminal.

The processing module is further configured to perform channel prediction based on the channel information of each terminal, to obtain a channel prediction result.

Optionally, the processing module is further configured to:

obtain a motion status of each terminal based on a channel, at different SRS moments, of the terminal, where the motion status is used to indicate a magnitude of a moving speed of the terminal, and the motion status includes a quasi-stationary state, a low-speed moving state, or a medium/high-speed moving state; and obtain a weight value of each terminal through calculation based on the channel prediction result of the terminal and the motion status of the terminal.

Optionally, the channel prediction result of the terminal includes an SRS channel eigenvector or weight value, and the processing module is specifically configured to:

if the motion status of the terminal is the quasi-stationary state, perform type-1 space domain and/or time domain filtering on the SRS channel prediction vector or weight value of the terminal;

if the motion status of the terminal is the low-speed moving state, perform type-2 space domain and/or time domain filtering on the SRS channel prediction vector or weight value of the terminal; or if the motion status of the terminal is the medium/high-speed moving state, perform second-moment calculation on the channel of the terminal to generate the weight value of the terminal.

Optionally, the processing module is specifically configured to:

perform least mean square filtering on an SRS prediction weight value of the terminal based on a subspace distance and a gradient descent method.

Optionally, the processing module is specifically configured to:

perform filtering on the SRS channel prediction vector or weight value of the terminal based on a Kalman filtering prediction algorithm;

perform filtering on the SRS channel prediction vector or weight value of the terminal based on a normalized least mean square adaptive filtering prediction algorithm;

perform filtering on the SRS channel prediction vector or weight value of the terminal based on a recursive least square RLS prediction algorithm; or perform filtering on the SRS channel prediction vector or weight value of the terminal based on an autoregressive AR filtering prediction algorithm.

Optionally, the processing module is specifically configured to:

preprocess a received to-be-processed frequency domain signal that is at an SRS location, and obtain, based on the preprocessed frequency domain signal, the channel information for sending the SRS by each terminal.

The preprocessing includes at least one of the following processing:

performing, according to a formula (1) $\tilde{y}(n)=w(n)*y(n)$, frequency domain filtering on the received to-be-processed frequency domain signal that is at the SRS location, where $y(n)$ is the frequency domain signal at the SRS location, $w(n)$ is a frequency domain window coefficient, $\tilde{y}(n)$ is a signal obtained through the frequency domain filtering, $n=0, \ldots, N$ is a channel estimation location index, and N is a channel estimation length;

performing, according to a formula (2) $\tilde{y}=w*y$, frequency domain filtering on the received to-be-processed frequency domain signal that is at the SRS location, where y is the frequency domain signal at the SRS location, whose dimension is N×1; w is a frequency domain window coefficient whose dimension is N×N; $\tilde{y}$ is a signal obtained through the frequency domain filtering, whose dimension is N×1; and N is a channel estimation length; or performing, based on a formula (3) $\tilde{y}=\mathcal{F}(y)$, time domain interference cancellation on the received to-be-processed frequency domain signal that is at the SRS location, where y is the to-be-processed frequency domain signal at the SRS location, whose dimension is N×1; $\mathcal{F}(\ )$ is a time domain cancellation transform function; y is a frequency domain signal obtained through the time domain cancellation, whose dimension is N×1; and N is a channel estimation length.

Optionally, the channel information of each terminal includes an SRS frequency domain channel estimation result of some subbands, and the processing module is further specifically configured to:

predicting full SRS bandwidth based on the SRS frequency domain channel estimation result of the some subbands of each terminal and a frequency domain extrapolation manner, to obtain the channel prediction result of the terminal.

Optionally, the processing module is further specifically configured to:

perform channel prediction on an SRS based on the channel information of each terminal and time-frequency-space two-dimensional inter-calibration, to obtain the channel prediction result of the terminal.

Optionally, the sending module is specifically configured to:

send first RRC signaling to each terminal, where the first RRC signaling carries at least one base sequence identifier; and when a terminal needs to change an SRS base sequence, send second RRC signaling to the terminal, where the second RRC signaling carries an index identifier, and the index identifier is used to indicate the terminal to send an SRS by using a first base sequence identifier in the at least one base sequence identifier.

Optionally, the sending module is specifically configured to:

send first RRC signaling to each terminal, where the first RRC signaling carries one base sequence identifier, and the base sequence identifier indicates a candidate set of all SRS base sequence identifiers.

A fourth aspect of this application provides an apparatus for improving multi-user multiplexing performance, including:

an obtaining module, configured to obtain a base sequence identifier that is configured by a network device by using RRC signaling, where there is no orthogonality between a base sequence indicated by the base sequence identifier and a base sequence used by another terminal; and a sending module, configured to send a sounding reference signal SRS based on the base sequence identifier.

Optionally, the obtaining module is specifically configured to:

receive first RRC signaling sent by the network device, where the first RRC signaling carries at least one base sequence identifier;

receive second RRC signaling sent by the network device, where the second RRC signaling carries an index identifier; and determine, based on the index identifier, to send the SRS by using a first base sequence identifier in the at least one base sequence identifier; or receive first RRC signaling sent by the network device, where the first RRC signaling carries one base sequence identifier.

A fifth aspect of this application provides a network device, including:

a processor, a memory, a receiver, and a transmitter.

The memory is configured to store a program and data. The processor invokes the program stored in the memory, to perform the method for improving multi-user multiplexing performance provided in any one of the first aspect or the implementations of the first aspect.

A sixth aspect of this application provides a terminal, including:

a processor, a memory, a receiver, and a transmitter.

The memory is configured to store a program and data. The processor invokes the program stored in the memory, to perform the method for improving multi-user multiplexing performance provided in any one of the second aspect or the implementations of the second aspect.

A seventh aspect of this application provides a computer-readable storage medium. The computer-readable storage medium includes a program. When executed by a processor, the program is configured to perform the method for improving multi-user multiplexing performance provided in any one of the first aspect or the implementations of the first aspect.

An eighth aspect of this application provides a computer-readable storage medium. The computer-readable storage medium includes a program. When executed by a processor, the program is configured to perform the method for improving multi-user multiplexing performance provided in any one of the second aspect or the implementations of the second aspect.

According to the method and apparatus for improving multi-user multiplexing performance, the device, and the storage medium that are provided in this application, the network device configures the base sequence identifiers for the plurality of terminals by using the RRC signaling, where there is no orthogonal characteristic between the base sequences indicated by the base sequence identifiers of all the terminals; the terminal obtains the base sequence identifier that is configured by the network device by using the RRC signaling, and sends the sounding reference signal SRS based on the base sequence identifier; the network device performs SRS detection on the plurality of terminals based on the quasi-orthogonal sequence, to obtain the channel information for sending an SRS by each terminal, and performs channel prediction based on the channel information of each terminal, to obtain the channel prediction result. SRS configuration and detection based on the quasi-orthogonal sequence, channel prediction, and calculation of the weight value of the terminal can effectively increase an average cell throughput and average user-perceived rate in a user movement scenario.

DESCRIPTION OF EMBODIMENTS

In a common channel prediction solution in a multi-user scenario, a mobile user and a stationary user are not distinguished from each other. This is not conducive to performing targeted algorithm design and optimization for mobile users. Channel information used for calculating a single-user (SU) beamforming (BF) weight value comes from a latest sounding reference signal (SRS). A time interval at which SRS information is sent is relatively long, usually in the order of tens of ms, and a user scheduling period is usually in the order of ms. In this case, there is an obvious problem that information being used does not match current actual channel information. Alternatively, during multi-user pairing, a zero forcing method is used to obtain a precoding weight value. The weight value is very sensitive to channel accuracy, and channel information used for calculating the weight value comes from latest SRS information. When a user moves, the information does not match a current actual channel. This is a main cause of performance degradation of a mobile user.

In another common solution, a channel, at different moments, of a user is used for mobile-user identification. However, because a channel has fading and many other non-ideal factors, a user movement status determined by indexing a user channel may not be accurate. During channel prediction, using simple weighted summation of a channel has poor robustness against non-ideal factors of the channel. For example, for a channel at different moments, there is a problem of a timing offset and terminal-side phase jump, and as a result, the channel varies greatly at the different moments. Performing prediction through simple weighted summation of a channel may lead to an incorrect channel prediction result.

For the foregoing existing problems, this application provides a method that can improve multi-user multiplexing performance. Specific improvement points include the following: SRS configuration and detection based on a quasi-orthogonal sequence, SRS channel prediction based on frequency domain extrapolation, SRS channel prediction based on time-frequency-space two-dimensional inter-calibration, determining of a user movement status and prediction accuracy, and calculation of an adaptive user weight value, including selecting, based on a user status determining result, from three weight value calculation manners: 1. weight value prediction based on a minimum subspace distance; 2. weight value prediction based on an autoregressive theory; and 3. signal to interference plus noise ratio (SINR) correction after pairing based on a statistical covariance matrix. Unless otherwise specified, data elements in this patent are all defined as plural.

The following uses several specific implementations to describe in detail the method for improving multi-user multiplexing performance provided in this application.

Figure 1:
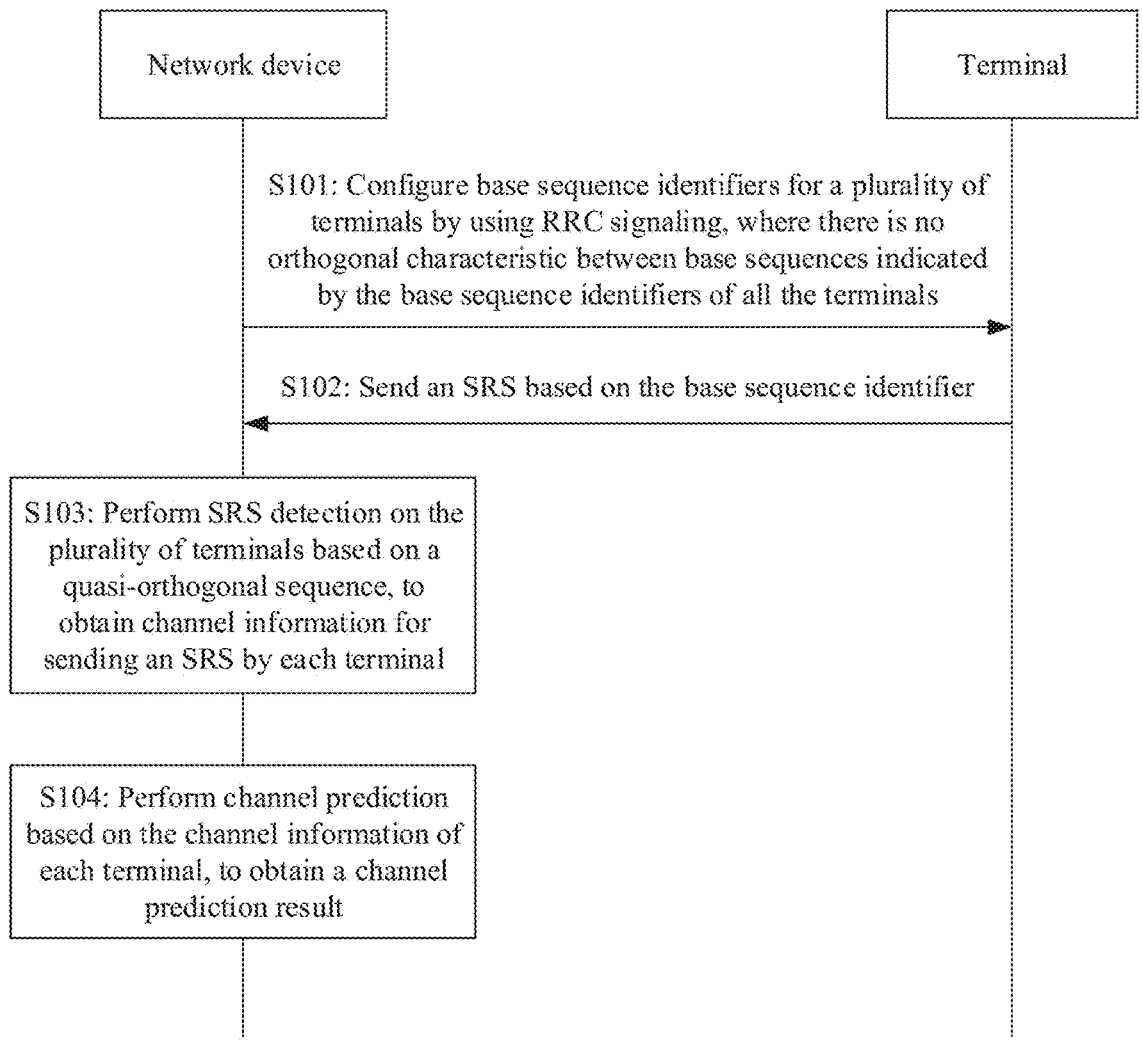
FIG. 1 is a flowchart of a first embodiment of a method for improving multi-user multiplexing performance according to this application.

FIG. 1 is a flowchart of a first embodiment of a method for improving multi-user multiplexing performance according to this application. As shown in FIG. 1, the method for improving multi-user multiplexing performance is mainly applied to a network device. The network device configures a base sequence identifier for a terminal, the terminal sends an SRS based on the base sequence identifier, and the network device performs SRS detection and channel prediction. The method specifically includes the following steps.

S101: Configure base sequence identifiers for a plurality of terminals by using RRC signaling, where there is no orthogonal characteristic between base sequences indicated by the base sequence identifiers of all the terminals.

In this step, a network side, namely, the network device, may choose to configure SRS base sequence identifiers for the terminals by using terminal RRC signaling, and the terminals obtain the SRS base sequence identifiers by receiving the RRC signaling sent by the base station side. The SRS base sequence identifier is used to generate an SRS base sequence. In addition, there is no orthogonality between the base sequences of all the terminals in the solution. Specific implementation of the solution includes at least the following two cases.

In a first case, the network device sends first RRC signaling to each terminal, where the first RRC signaling carries at least one base sequence identifier. Then, when a terminal needs to change an SRS base sequence, the network device sends second RRC signaling to the terminal, where the second RRC signaling carries an index identifier, and the index identifier is used to indicate the terminal to send an SRS by using a first base sequence identifier in the at least one base sequence identifier. The terminal receives the first RRC signaling sent by the network device; receives, when needing to change an SRS base sequence, the second RRC signaling sent by the network device, where the second RRC signaling carries the index identifier; and determines, based on the index identifier, to send an SRS by using the first base sequence identifier in the at least one base sequence identifier.

During specific implementation, using an example in which the network device is a base station, the base station may preconfigure, for the terminal by using RRC signaling 0, a set of SRS base sequence identifiers including at least one SRS base sequence identifier. Then, each time the terminal needs to change an SRS base sequence, the base station configures one index identifier for the terminal by using RRC signaling 1, where the identifier is used to indicate the terminal to send an SRS by using one of a plurality of SRS base sequence identifiers in the set of SRS base sequence identifiers.

In a second case, the network device sends first RRC signaling to each terminal, where the first RRC signaling carries one base sequence identifier, and the base sequence identifier indicates a candidate set of all SRS base sequence identifiers. The terminal receives the first RRC signaling sent by the network device, where the first RRC signaling carries the one base sequence identifier.

During specific implementation of the solution, using an example in which the network device is a base station, the base station may configure one SRS base sequence identifier for the terminal by using RRC signaling 0, where a range indicated by the sequence identifier includes the candidate set of all SRS base sequence identifiers. Then, each time the terminal needs to change an SRS base sequence, the base station configures another SRS base sequence identifier for the terminal by using the RRC signaling 0, where a range indicated by the sequence identifier includes the candidate set of all SRS base sequence identifiers.

Figure 2:
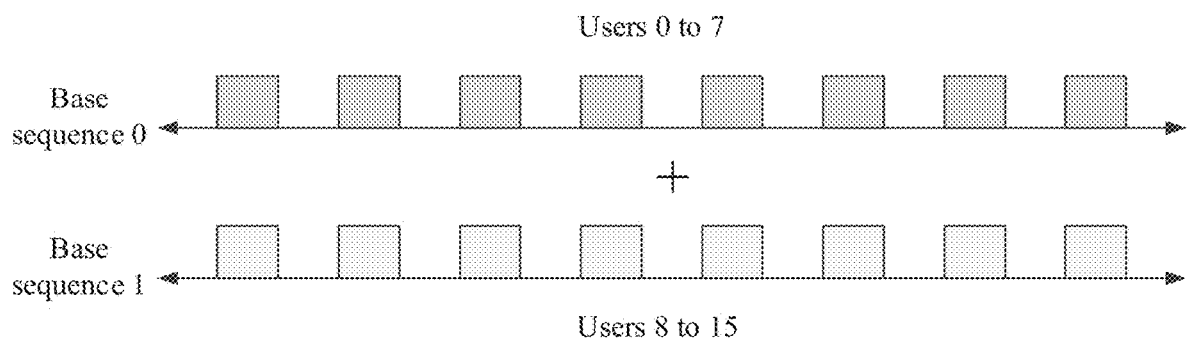
FIG. 2 is a schematic diagram of an SRS base sequence according to this application.

FIG. 2 is a schematic diagram of an SRS base sequence according to this application. As shown in FIG. 2, in this solution, base sequence names are merely used to distinguish between different SRS sequences caused by cyclic shifts of SRSs of different terminals. If different users generate SRS sequences by configuring cyclic shifts, the sequences are separable through windowing when transformed to time domain sequences, that is, the different users occupy different time domain segments. For example, users 0 to 7 use different cyclically shifted SRS sequences, which are separable in time domain. If different users generate SRS sequences by configuring different base sequences, the sequences are inseparable through windowing when transformed to time domain sequences, for example, sequences of a user 0 and a user 8.

S102: Send an SRS based on the base sequence identifier.

In this step, on a terminal side, after the network device configures the base sequence identifier, the corresponding terminal obtains the base sequence identifier that is configured by the network device by using the RRC signaling, obtains a corresponding base sequence according to the foregoing descriptions, and then sends the SRS.

S103: Perform SRS detection on the plurality of terminals based on a quasi-orthogonal sequence, to obtain channel information for sending an SRS by each terminal.

In this step, after the terminal sends the SRS based on the base sequence identifier configured by the network device, the network device may perform SRS detection. In this application, the network device detects SRSs of the plurality of terminals based on the quasi-orthogonal sequence, to obtain the channel information for sending an SRS by each terminal. In a conventional channel estimation algorithm, a base station performs time-domain windowing for different users after performing reference signal sequence removal on received reference signal sequences, to separate multiplexed users of a plurality of different cyclically shifted SRS sequences. However, when a network device configures a plurality of base sequences for a plurality of multiplexed terminals, the terminals (which may also be referred to as users) with the different base sequences cannot be separated by using a conventional channel estimation method. This results in sequence interference between the terminals with the different base sequences. Consequently, channel estimation performance is degraded. The following PDP is short for power delay profile.

According to a quasi-orthogonal sequence based SRS detection method provided in this application, a received to-be-processed frequency domain signal at an SRS location may be preprocessed, and then the channel information for sending an SRS by each terminal is obtained based on the preprocessed frequency domain signal. A process of the preprocessing includes at least one of the following operation processes, or may include a combination of a plurality of operation processes:

1. The network device performs frequency domain filtering on the received to-be-processed frequency domain signal that is at the SRS location:

$$\tilde{y}(n) = w(n) * y(n) \qquad \text{formula (1)}$$

Herein, y(n) is the frequency domain signal at the SRS location, w(n) is a frequency domain window coefficient, $\tilde{y}(n)$ is a signal obtained through the frequency domain filtering, n=0, . . . , N is a channel estimation location index, and N is a channel estimation length. w(n) may be prestored or pre-calculated for storage, or may be obtained through online calculation by using some parameters. Preferably, in a multi-antenna or multi-beam dimension, same w(n) may be applied to a plurality of antennas or a plurality of beams.

2. The network device performs frequency domain filtering on the received to-be-processed frequency domain signal that is at the SRS location:

$$\tilde{y}=w*y \quad \text{formula (2)}$$

Herein, y is the frequency domain signal at the SRS location, whose dimension is N×1; w is a frequency domain window coefficient, whose dimension is N×N; $\tilde{y}$ is a signal obtained through the frequency domain filtering, whose dimension is N×1; and N is a channel estimation length. w may be pre-calculated for storage, or may be obtained through online calculation by using some parameters. The parameters include but are not limited to an SRS sequence, signal-to-noise ratio information, time domain window related coefficient information (including a quantity of subpaths, a quantized delay of a subpath, a subpath amplitude and phase, and the like), and the like. Preferably, in a multi-antenna or multi-beam dimension, same w(n) may be applied to a plurality of antennas and a plurality of beams.

3. The network device performs time domain interference cancellation on the received frequency domain signal that is at the SRS location:

$$\tilde{y}=\mathcal{F}(y) \quad \text{formula (3)}$$

Herein, y is the to-be-processed frequency domain signal at the SRS location, whose dimension is N×1; $\mathcal{F}()$ is a time domain cancellation transform function (which may also be denoted by $\mathcal{F}(\blacksquare)$); $\tilde{y}$ is a frequency domain signal obtained through the time domain cancellation, whose dimension is N×1; and N is a channel estimation length. A function of $\mathcal{F}()$ is to cancel, for y, mutual interference between different base sequence channels in time domain to obtain all independent base sequence channels for which interference between base sequences is minimized, and then transform each base sequence to a frequency domain sequence after performing time-domain windowing based noise reduction on the base sequence, to obtain channel values corresponding to different SRS sequences.

The function $\mathcal{F}(\blacksquare)$ may be equivalent to performing at least one of the following operations:

(1) Time-frequency transform is performed on the to-be-processed frequency domain signal to transform the to-be-processed frequency domain signal to a time domain signal, interference between different base sequences is cancelled sequentially or in parallel in time domain, and then channel estimation is performed on each base sequence independently in a time-domain windowing manner.

(2) SRSs of different base sequences and/or different sequences are divided into groups, that is, SRSs of a same base sequence are grouped into one group, to obtain several groups of SRS sequences.

(3) Different SRS groups (and/or sequences and/or subpaths) are sorted according to a specific criterion. The corresponding criterion includes but is not limited to average signal to interference plus noise ratios, quantities of SRS sequences, average received powers of SRS sequences, and the like of the different groups.

(4) Least square channel estimation is performed on the $p^{th}$ group of SRS sequences based on a sorting result:

$$\bar{y}_{p,f}=P_p^H y_p \quad (4)$$

Frequency domain to time domain transform is performed on $\bar{y}_{p,f}$ to transform the frequency domain signal $\bar{y}_{p,f}$ to a time domain signal $\bar{y}_{p,t}$. In time domain, a time domain point (or a subpath) that meets a preset condition is selected to be unset, and/or a corresponding before-unsetting time domain point value $L_p$ is recorded, where $L_p$ is a set of time domain point values recorded for the $p^{th}$ time. Then, time domain to frequency domain transform is performed, to transform a processed time domain signal to a frequency domain signal $\bar{y}_{p+1,f}$, and then a reference signal addition operation is performed:

$$y_{p+1}=P_p \bar{y}_{p+1,f} \quad (5)$$

The foregoing operation process may be performed for K times. Optionally, K may be equal to a quantity of SRS groups, or a quantity of execution times that meets a preset condition.

(5) An add-back operation is performed on the $L_p$ set stored in step (4):

$$\bar{y}_p=P_p^H y_K \oplus \tilde{L}_p \quad (6)$$

$\oplus$ represents adding a corresponding $L_p$ value back to a time domain point corresponding to $L_p$.

(6) Windowing-based noise reduction is performed on a time domain value $y_p$ of each group, obtained through a previous operation. That is, windowing processing is performed on $y_p$ by using a pre-calculated or stored window $W_{p,j}$:

$$\tilde{y}_{p,j}=y_p*W_{p,j} \quad (7)$$

Herein, $\tilde{y}_{p,j}$ is the $j^{th}$ user time domain channel coefficient of the $p^{th}$ group, and $W_{p,j}$ is the $j^{th}$ user time domain window coefficient of the $p^{th}$ group. Then, time domain to frequency domain transform is performed on the obtained $j^{th}$ user time domain window coefficient of the $p^{th}$ group to obtain the $j^{th}$ user frequency domain channel coefficient of the $p^{th}$ group.

(7) A cross-correlation sequence $P_{p_1 p_2}(t)=P_{p_1}(t) \times P_{p_2}^*(t)$ of each SRS base sequence is calculated, where t=0, 1, . . . , T−1, $p_1$ and $p_2$=1, 2, . . . , $N_{base}$, $p_1 \neq p_2$, and $N_{base}$ is a quantity of base sequences; and/or an operation or equivalent operation of discrete Fourier transform (DFT) or inverse fast Fourier transform (IFFT) is performed after zero padding to $N_{FFT}$ points, where $N_{FFT}$ is a quantity of discrete Fourier transform (DFT) or IFFT operation points. A result is denoted by $\tilde{P}_{p_1 p_2}(l)$, where l=0, 1, . . . , $N_{FFT}-1$.

(8) The following calculation is performed in an order of p=1, 2, . . . , $N_{base}$:

(a) A large-time domain path point of a $p^{th}$ cell is found according to a specific criterion.

(b) The large-time domain path point of the $p^{th}$ cell is eliminated in a PDP of another cell.

Optionally, for all l meeting a specific criterion and all p meeting $\bar{p} \neq p$ in a search result, $y_{PDP_{\bar{p}}}(l) \leftarrow y_{PDP_{\bar{p}}}(l) - h_{PDP_p}(l) \times \tilde{P}_{p,\bar{p}}((l-l+N_{FFT})\%N_{FFT})$ is calculated, where l=0, 1, . . . , $N_{FFT}-1$ ($a_{th,p}$ with p=1, 2, . . . , $N_{base}$ is an adjustable parameter), or a theoretically equivalent operation is performed. $y_{PDP_{\bar{p}}}$ is a PDP result obtained by extrapolating $y_{PDP_p}$ to the $N_{FFT}$ points through zero padding or virtual-subcarrier addition, and performing IDFT. A method for extrapolation through virtual-subcarrier addition includes: multiplying a signal of all or some of existing subcarriers by a weight value that is prestored or calculated online, to obtain a signal value outside the subcarrier. The weight value may be obtained through calculation by using a minimum mean square error criterion and/or a signal-to-noise ratio parameter and/or an SRS sequence related parameter. % is a modulo symbol.

(9) A DFT operation is performed on $y_{PDP_p}$ on which interference cancellation is performed, and a value of a location corresponding to a subcarrier is selected. A result is denoted by $\bar{y}_p$. Baseline SRS channel estimation continues to be performed on $\bar{y}_p$, to obtain a frequency domain channel estimation result of all UEs in a target cell.

(10) Iterative interference cancellation is performed: Interference cancellation is repeatedly performed for X times by using a PDP obtained through interference cancellation and an original PDP of each cell, where X is a quantity of iteration times that is predefined or meets a specific condition.

(11) More accurate subcarrier user interference cancellation is implemented through reconstruction. This means that a more complete PDP is reconstructed by using some of large-path time domain points, to improve interference cancellation quality.

Figure 3:
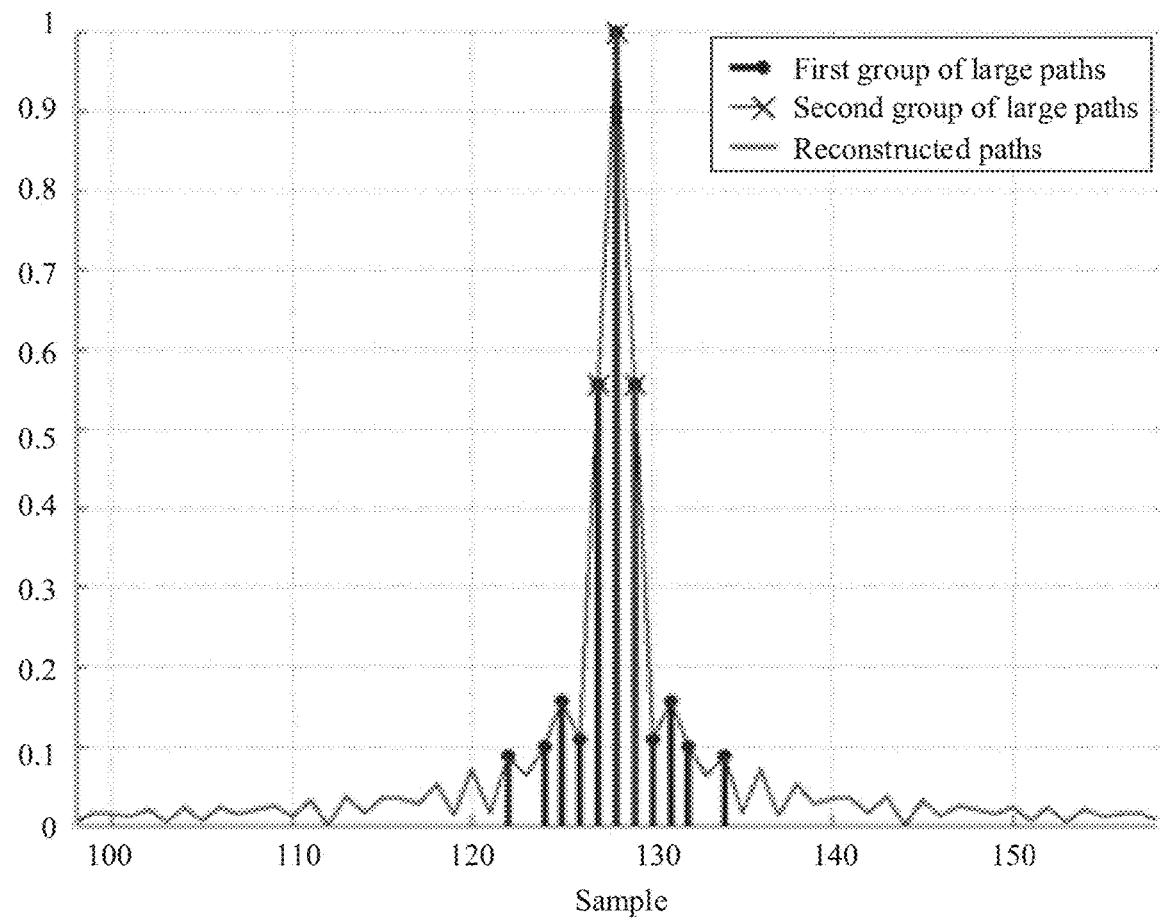
FIG. 3 is a schematic diagram of reconstruction according to this application.

(12) A reconstruction operation may be represented as $$\tilde{P}_0 = \frac{1}{\sqrt{N_{FFT}}} F^H \begin{bmatrix} 1_T \\ 0 \end{bmatrix}$$

or an equivalent operation, where $1_T$ represents a T×1-dimensional all-ones column vector. It is assumed that $\tilde{y}_{n,PDP_p}$ represents Y large-path time domain points selected from the $p^{th}$ cell (where a quantity of dimensions of Y is predefined, or is a predefined maximum quantity of selected time domain points, or a quantity of path time domain points that meets a specific condition). In this case, the first step of reconstruction is solving an equation $Ax=\tilde{y}_{n,PDP_p}$ (similar to deconvolution or an equivalent operation) or an equivalent operation, where A is a matrix that includes corresponding elements selected from $\tilde{P}_0$ based on a quantity of large paths and a large-path location, a dimension of A is Y×Y, x represents a time domain path fitted by using these large paths, and a dimension of x is Y×1. After x is obtained, circular convolution or an equivalent operation is performed on x and $\tilde{P}_0$, thereby obtaining a reconstructed PDP whose length is $N_{FFT}$. A weak-path component strongly correlated with a large path can be cancelled through interference cancellation by using the reconstructed PDP. FIG. 3 is a schematic diagram of reconstruction according to this application. As shown in FIG. 3, the figure includes only one true path without interference or noise. In FIG. 3, dots represent a group of large paths (namely, the first group of large paths) selected by using an interference cancellation solution without reconstruction, crosses represent three used-for-reconstruction large paths (namely, the second group of large paths) selected by using a higher threshold, and relatively thin lines represent reconstructed PDPs (Power Delay Profile, power delay profile) (namely, reconstructed paths) obtained through inversion and circular convolution. After the reconstructed PDPs are obtained, other weak paths that do not overlap locations of the first group of large paths can be cancelled together (where an overlapped location is also subject to the large paths selected for the first time).

According to the foregoing descriptions, the following provides several embodiments of obtaining channel information of a terminal in a specific implementation process.

Embodiment 1

Figure 4:
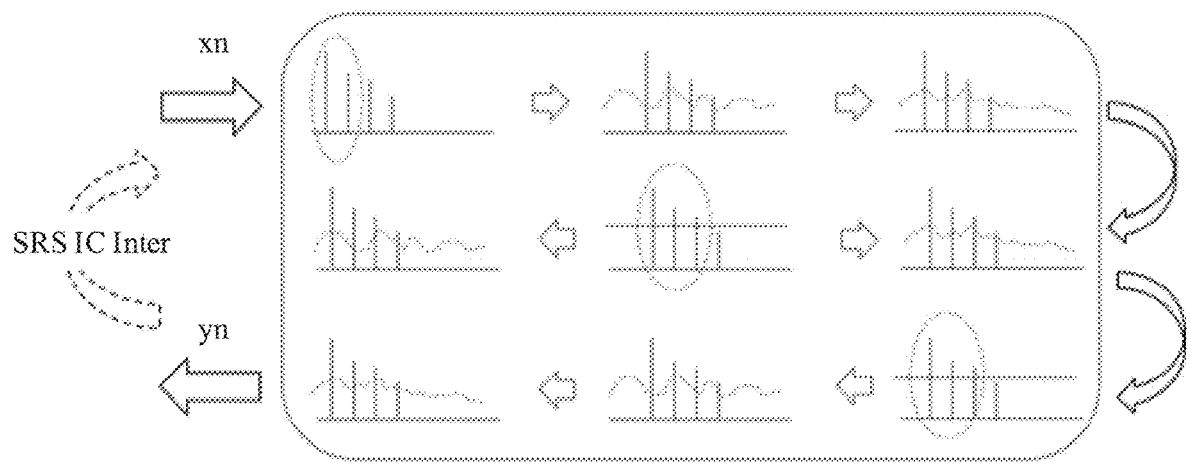
FIG. 4 is a schematic diagram of an SRS IC process according to this application.

FIG. 4 is a schematic diagram of an SRS interference cancellation (IC) process according to this application. As shown in FIG. 4, along a horizontal axis from left to right, frequency domain received signals of three base sequences undergo a least square (LS) operation on the respective sequences, then the sequences are transformed to time domain PDP profiles denoted by $PDP_0$, $PDP_1$, and $PDP_2$, and then results of normalizing a mean power of interference noise outside a signal time domain window by using signal powers in the PDP profiles are calculated, and are denoted by time domain point selection values $PDP_{0,NI}$, $PDP_{1,NI}$, and $PDP_{2,NI}$. In the first step, for the first base sequence, several time domain point values $T_0$ greater than a preset threshold are selected from the time domain point selection value $PDP_{0,NI}$, and then interference of the time domain point value $T_0$ of the first base sequence is cancelled in the other two PDP profiles by using correlation between the first base sequence and the other base sequences. The time domain PDP profiles of the second base sequence and the third base sequence are updated. In the second step, for the second base sequence, several time domain point values $T_1$ greater than a preset threshold are selected from the time domain point selection value $PDP_{1,NI}$, and then interference of the time domain point value $T_1$ of the second base sequence is cancelled in the other two PDP profiles by using correlation between the first base sequence and the other base sequences. The time domain PDP profiles of the first base sequence and the third base sequence are updated. In the third step, for the third base sequence, several time domain point values $T_2$ greater than a preset threshold are selected from the time domain point selection value $PDP_{2,NI}$, and then interference of the time domain point value $T_2$ of the third base sequence is cancelled in the other two PDP profiles by using correlation between the first base sequence and the other base sequences. The time domain PDP profiles of the first base sequence and the second base sequence are updated. Then, time domain PDPs corresponding to the three base sequences are separately output. Subsequently, windowing-based noise reduction and a time domain to frequency domain transform operation may be performed.

Optionally, an iteration mechanism may be introduced. The foregoing output time domain PDPs of the three base sequences are used as inputs of a next iteration, and another round of interference cancellation is performed according to the steps in the foregoing paragraph. A quantity of iterations may be preset, or iterating is stopped when a condition is met.

Embodiment 2

Figure 5:
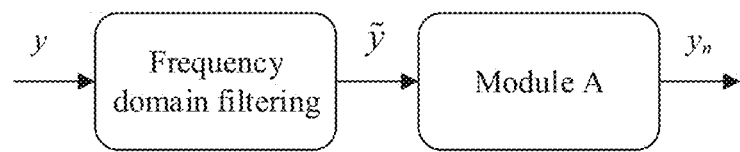
FIG. 5 is a schematic diagram of filtering interference cancellation according to this application.

An operation in FIG. 4 is used as a module A, and frequency domain filtering may be performed before the module A. FIG. 5 is a schematic diagram of filtering interference cancellation according to this application. As shown in FIG. 5, for example, a frequency domain received signal is y, a dimension of y is S×1, ω is a frequency domain filtering coefficient, a dimension of ω is S×1, S is a quantity of subcarriers, and frequency domain filtering is performed on y:

$$\tilde{y} = \omega * y \qquad (8)$$

Herein, "*" represents element-wise multiplication, and $\tilde{y}$ is a frequency domain value obtained through the frequency domain filtering.

The frequency domain value $\tilde{y}$ obtained through the filtering is used as an input signal xn of the module A, and after processing (not iterated, or iterated for a plurality of times), yn is output.

Embodiment 3

An operation in FIG. 4 is used as a module A. After selection of a large-path time domain point of each base sequence in the module A, time domain path reconstruction is performed before interference cancellation. A reconstruction operation may be represented as $$\tilde{P}_0 = \frac{1}{\sqrt{N_{FFT}}} F^H \begin{bmatrix} 1_T \\ 0 \end{bmatrix}$$

or an equivalent operation, where $1_T$ represents a T×1-dimensional all-ones column vector. It is assumed that $\tilde{y}_{n,PDPp}$ represents Y large-path time domain points selected from a $p^{th}$ cell (a quantity of dimensions of Y is predefined, or is a predefined maximum quantity of selected time domain points, or a quantity of path time domain points that meets a specific condition). In this case, the first step of reconstruction is solving an equation Ax=$\tilde{y}_{n,PDPp}$ (similar to deconvolution or an equivalent operation) or an equivalent operation, where A is a matrix that includes corresponding elements selected from $\tilde{P}_0$ based on a quantity of large paths and a large-path location, a dimension of A is Y×Y, x represents a time domain path fitted by using these large paths, and a dimension of x is Y×1. After x is obtained, circular convolution or an equivalent operation is performed on x and $\tilde{P}_0$, thereby obtaining a reconstructed PDP whose length is $N_{FFT}$. A weak-path component strongly correlated with a large path can be cancelled through interference cancellation by using the reconstructed PDP. FIG. 3 is a schematic diagram of the foregoing reconstruction process. The figure includes only one true path without interference or noise. In the figure, dots represent a group of large paths (the first group of large paths) selected by using an interference cancellation solution without reconstruction, crosses represent three used-for-reconstruction large paths (the second group of large paths) selected by using a higher threshold, and thin lines represent reconstructed PDPs (reconstructed paths) obtained through inversion and circular convolution. After the reconstructed PDPs are obtained, other weak paths that do not overlap locations of the first group of large paths can be cancelled together (where an overlapped location is also subject to the large paths selected for the first time).

Embodiment 4

An operation in FIG. 4 is used as a module A. A frequency domain filtering step such as the formula (8) may be performed before the module A. After selection of a large-path time domain point of each base sequence in the module A, time domain path reconstruction is performed before interference cancellation. A reconstruction operation may be represented as $$\tilde{P}_0 = \frac{1}{\sqrt{N_{FFT}}} F^H \begin{bmatrix} 1_T * \omega^T \\ 0 \end{bmatrix}$$

or an equivalent operation, where $1_T$ represents a T×1-dimensional all-ones column vector. It is assumed that $\tilde{y}_{n,PDPp}$ represents Y large-path time domain points selected from a $p^{th}$ cell (where a quantity of dimensions of Y is predefined, or is a predefined maximum quantity of selected time domain points, or a quantity of path time domain points that meets a specific condition). In this case, the first step of reconstruction is solving an equation Ax=$\tilde{y}_{n,PDPp}$ (similar to deconvolution or an equivalent operation) or an equivalent operation, where A is a matrix that includes corresponding elements selected from $\tilde{P}_0$ based on a quantity of large paths and a large-path location, a dimension of A is Y×Y, x represents a time domain path fitted by using these large paths, and a dimension of x is Y×1. After x is obtained, circular convolution or an equivalent operation is performed on x and $\tilde{P}_0$, thereby obtaining a reconstructed PDP whose length is $N_{FFT}$. A weak-path component strongly correlated with a large path can be cancelled through interference cancellation by using the reconstructed PDP. FIG. 3 is a schematic diagram of the foregoing reconstruction process. The figure includes only one true path without interference or noise. In the figure, dots represent a group of large paths (the first group of large paths) selected by using an interference cancellation solution without reconstruction, crosses represent three used-for-reconstruction large paths (the second group of large paths) selected by using a higher threshold, and thin lines represent reconstructed PDPs (reconstructed paths) obtained through inversion and circular convolution. After the reconstructed PDPs are obtained, other weak paths that do not overlap locations of the first group of large paths can be cancelled together (where an overlapped location is also subject to the large paths selected for the first time).

Embodiment 5

Figure 6:
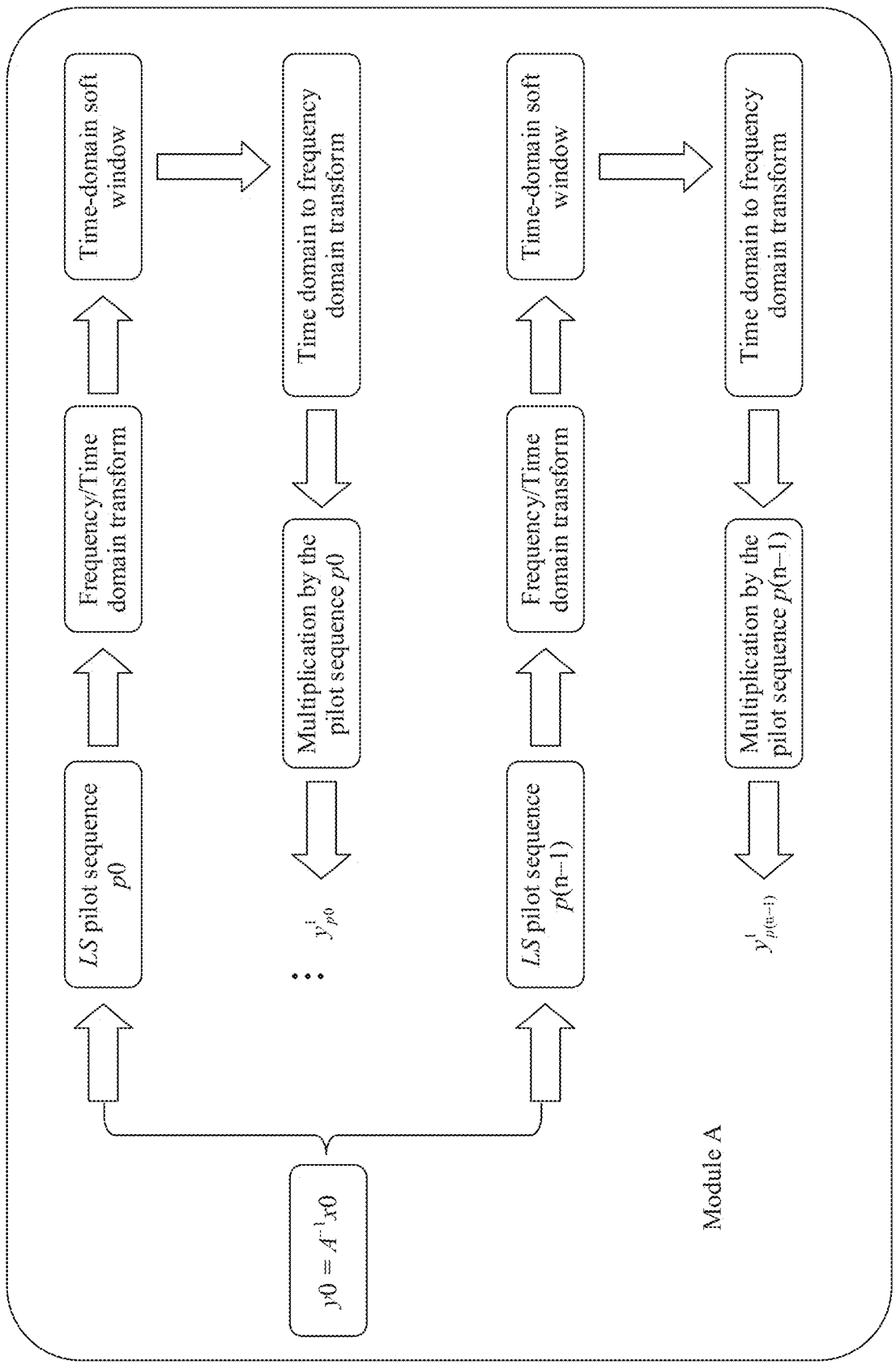
FIG. 6 is a schematic diagram of a multi-user filtering interference cancellation module A according to this application.

FIG. 6 is a schematic diagram of a multi-user filtering interference cancellation module A according to this application. As shown in FIG. 6, an input is x0. Matrix frequency domain filtering is first performed on the input x0. A dimension of a filtering matrix $A^{-1}$ is T×T. An output obtained through the filtering is y0. An LS operation, namely, $y_{f,pn}=y0*p_n^*$, is performed on the $p_n^{th}$ base sequence by using y0. Then, time-frequency transform is performed on $y_{pn}$ to transform $y_{pn}$ to a time domain sequence $y_{t,pn}$. A soft window coefficient $\tilde{\omega}$ is calculated by using a signal-to-noise ratio parameter, or is prestored. A soft windowing operation, namely, $\tilde{y}_{t,pn}=\tilde{\omega}*y_{t,pn}$, is performed on $y_{t,pn}$ in time domain. Time-frequency transform is performed on $\tilde{y}_{t,pn}$ to transform $\tilde{y}_{t,pn}$ to a frequency domain sequence $\tilde{y}_{f,pn}$. Then, $\tilde{y}_{f,pn}$ is multiplied by a corresponding pilot sequence $p_n$ to obtain $y_{pn}^1=\tilde{y}_{f,pn}*p_n$. All of the foregoing operations are represented as the module A.

Figure 7:
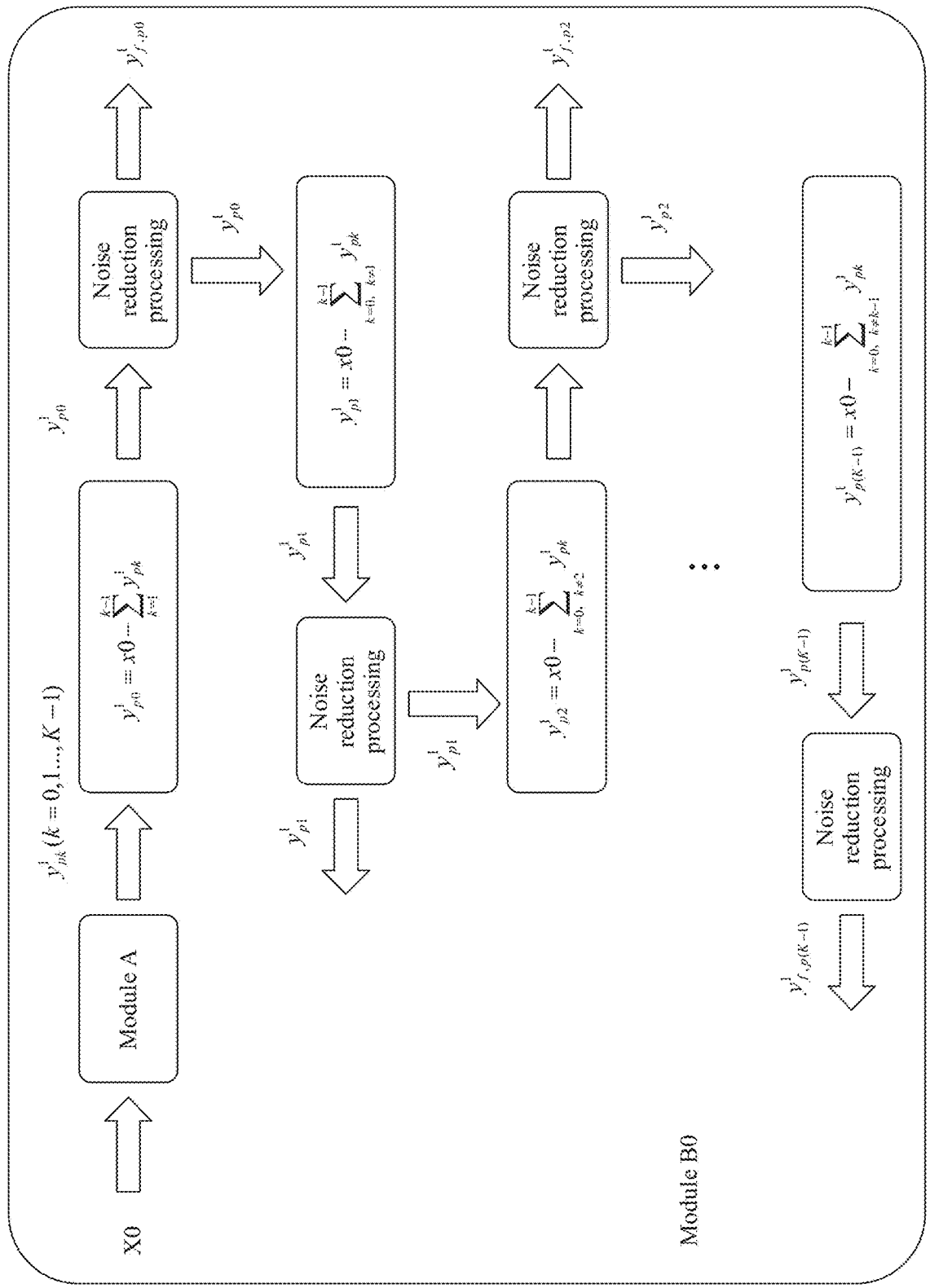
FIG. 7 is a schematic diagram of a multi-user filtering interference cancellation module B0 according to this application.

FIG. 7 is a schematic diagram of a multi-user filtering interference cancellation module B0 according to this application. The module B0 integrates the operations of the module A, and performs further signal processing by using yon output by the module A. As shown in FIG. 7, the module B0 updates $$y_{pn}^1 = x0 - \sum_{k=0,k\neq n}^{K-1} y_{pk}^1;$$

then performs noise reduction processing (for example, a noise reduction algorithm of windowing-based noise reduction or time domain point selection after $y_{pn}^1$ is transformed to a time domain sequence) on $y_{pn}^1$; outputs yon; and then, for the $(n+1)^{th}$ base sequence, updates $$y_{p(n+1)}^1 = x0 - \sum_{k=0,k\neq n+1}^{K-1} y_{pk}^1$$

by using previous n updated $y_{pn}^1$ s. An output sequence $y_{f,pn}^1$ is a frequency domain data output of all users that have different cyclic shifts of a same base sequence and that have undergone a time domain window user separation process.

Embodiment 6

Figure 8:
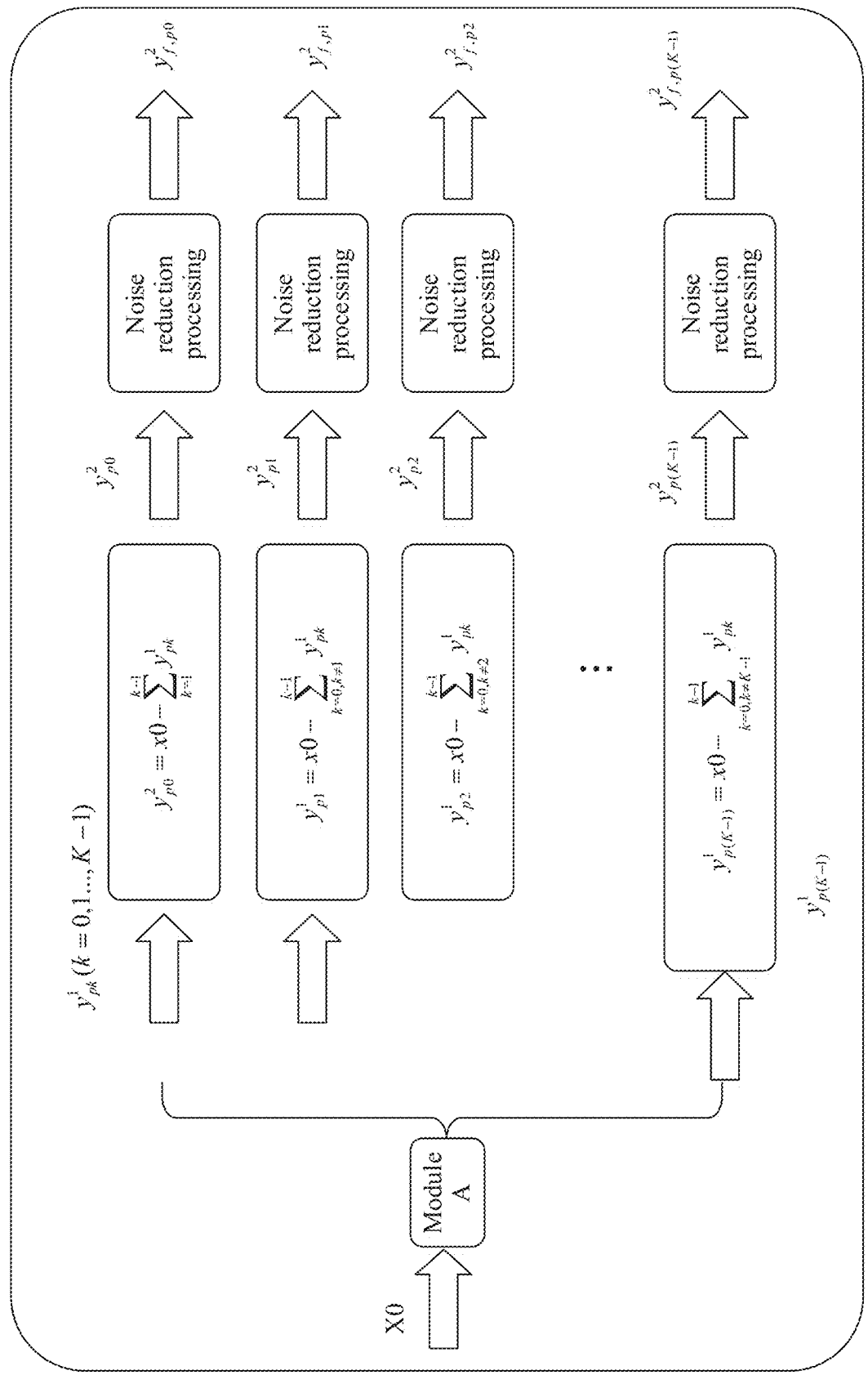
FIG. 8 is a schematic diagram of a multi-user filtering interference cancellation module B1 according to this application.

FIG. 8 is a schematic diagram of a multi-user filtering interference cancellation module B1 according to this application. As shown in FIG. 8, the module B1 integrates operations of a module A, and performs further signal processing by using $y_{pn}^1$ output by the module A. The module B1 updates $$y_{pn}^1 = x0 - \sum_{k=0,k\neq n}^{K-1} y_{pk}^1,$$

then performs noise reduction processing on $y_{pn}^1$, and outputs $y_{f,pn}^1$ that is a frequency domain data output of all users that have different cyclic shifts of a same base sequence and that have undergone a time domain window user separation process.

SRS detection processing is performed according to any one of the foregoing solutions, thereby obtaining the channel information of each terminal.

S104: Perform channel prediction based on the channel information of each terminal, to obtain a channel prediction result.

In this step, after obtaining the channel information of each terminal, the network device may perform channel prediction. This application provides the following several prediction manners.

First prediction manner: SRS channel prediction is performed based on frequency domain extrapolation.

In this solution, the channel information of each terminal includes an SRS frequency domain channel estimation result of some subbands, and the network device predicts full SRS bandwidth based on the SRS frequency domain channel estimation result of the some subbands of each terminal and a frequency domain extrapolation manner, to obtain the channel prediction result of the terminal.

Figure 9:
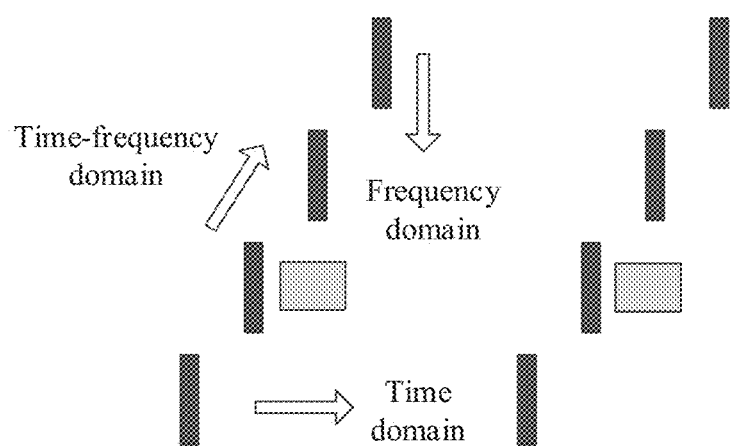
FIG. 9 is a schematic diagram of an SRS time-frequency resource according to this application.

In an actual system, considering a transmit power limitation of a terminal, an SRS is sent by using partial bandwidth. FIG. 9 is a schematic diagram of an SRS time-frequency resource according to this application. As shown in FIG. 9, the SRS time-frequency resource includes a time domain resource and a frequency domain resource. In the figure, a horizontal direction represents a time domain, and a vertical direction represents a frequency domain. Through four times of SRS frequency hopping, full SRS bandwidth is covered. Each user uses ¼ of the full SRS bandwidth each time to carry an SRS signal.

Herein, it is expected that an SRS frequency domain channel estimation result of some subbands can be used for extrapolation to full bandwidth, to obtain a full-bandwidth channel estimation result. In this manner, each user can implement channel information feedback by using only ¼ of the SRS bandwidth. In this case, an SRS capacity is four times a baseline capacity. When a total SRS quantity remains unchanged, a feedback period of each user is shortened to ¼ of an original period. This implements frequency domain capacity expansion, and improves performance in a mobile scenario.

Herein, time domain sparsity is mainly used, which may also be expressed as that a frequency domain signal includes a space spanned by a small quantity of time domain sparse path bases. A time domain signal may be represented as follows by using sparsity:

$$h(t) = \sum_{p=1}^{N_{paths}} A_p W_p(t - \tau_p) \tag{9}$$

Therefore, a multipath delay and a corresponding amplitude are obtained by using partial bandwidth, to obtain a full-bandwidth frequency domain signal. $N_{paths}$ is a quantity of time domain sparse paths, $a^p$ is an amplitude and phase parameter of the time domain path, and $W_p(t-\tau_p)$ is a parameter of a phase change and/or an amplitude change resulting from Doppler frequency shift, Doppler spread, and a multipath delay over time. Parameters $N_{paths}$, $A_p$, $W_p$, and $\tau_p$ of each time domain point are estimated by using obtained frequency domain data of the partial SRS bandwidth. Then, h(t) is restored by using the parameters, and then SRS channel information of another frequency band is restored through time domain to frequency domain transform. Preferably, the channel information of the another frequency band may be obtained through extrapolation by calculating a frequency domain filtering coefficient:

$$H_{extended} = WH_{exist} \tag{10}$$

A dimension of W is N×S, a dimension of $H_{exist}$ is S×1, and a dimension of $H_{extended}$ is N×1.

$$W = \begin{bmatrix} f_{0,0}(s_0, \ldots, s_{S-1}) & \cdots & f_{0,S-1}(s_0, \ldots, s_{S-1}) \\ \vdots & \ddots & \vdots \\ f_{N-1,0}(s_0, \ldots, s_{S-1}) & \cdots & f_{N-1,S-1}(s_0, \ldots, s_{S-1}) \end{bmatrix} \tag{11}$$

N is a full-bandwidth subcarrier quantity, S is a partial-bandwidth subcarrier quantity, and foo is a mapping function for mapping a frequency domain channel of each subcarrier of partial bandwidth to each subcarrier of full bandwidth.

Preferably, a time-domain related parameter may be found in the following manner:

A frequency domain signal is transformed to a sparse basis domain signal through sparse basis transform. A basis that meets a specific constraint condition is iteratively selected from each (group) as a candidate basis by using a 1-norm or 0-norm sparsification method. When a specific condition is met, iterating is stopped, and a candidate basis set is transformed from a sparse domain signal to a frequency domain signal, to restore a full-bandwidth frequency domain channel.

Second prediction manner: SRS channel prediction is performed based on time-frequency-space two-dimensional inter-calibration.

In this solution, the network device performs channel prediction on an SRS based on the channel information of each terminal and time-frequency-space two-dimensional inter-calibration, to obtain the channel prediction result of the terminal.

Figure 10:
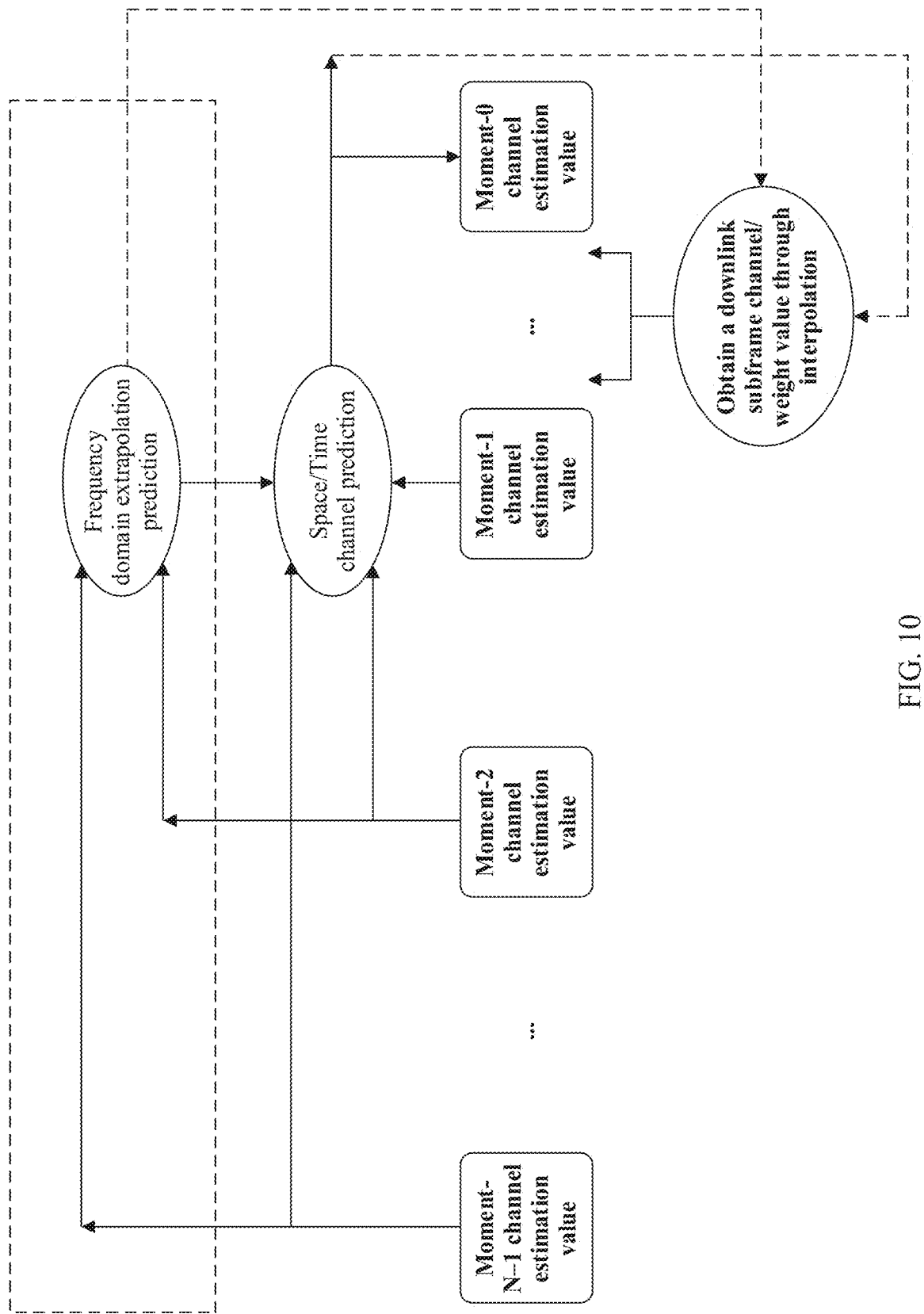
FIG. 10 is an architectural diagram of an SRS channel prediction solution based on time-frequency-space two-dimensional inter-calibration according to this application.

During specific implementation of this solution, a future SRS channel value is predicted in time domain based on a Kalman filtering prediction algorithm, or an autoregressive prediction algorithm by using a historical SRS channel. FIG. 10 is an architectural diagram of an SRS channel prediction solution based on time-frequency-space two-dimensional inter-calibration according to this application. As shown in FIG. 10, a dashed-line part represents an optional part, and a specific operation includes at least one of the following steps:

1: Estimate a moment-0 channel estimation value according to a time domain channel prediction algorithm solution by using N estimated historical SRS channel values, where a moment 1 is a current moment, a moment N−1~2 is a historical moment, and a moment 0 is a future moment. Preferably, corresponding to the time domain channel prediction algorithm solution, a Kalman filtering algorithm or an autoregressive algorithm may be used.

2: Estimate a moment-0 channel eigenvector or weight value according to a time domain vector prediction algorithm solution by using N estimated historical SRS channel eigenvectors or weight values, where a moment 1 is a current moment, a moment N−1~2 is a historical moment, and a moment 0 is a future moment. Preferably, corresponding to the time domain channel prediction algorithm solution, a Kalman filtering algorithm or an autoregressive algorithm may be used.

3: Correct steps 1 and 2 by using S (S≥1) historical frequency domain channel coefficients and a frequency domain extrapolation algorithm, to obtain a result, and use the result as a moment-0 channel or vector value.

4: Calculate a channel or vector of several downlink subframes between two SRS moments by using a linear interpolation algorithm.

5: Perform interpolation by using a time domain prediction intermediate parameter, a frequency domain extrapolation parameter, and a channel value or vector value of an SRS moment 1 and/or an SRS moment 0, to obtain a channel or vector of several downlink subframes between the two SRS moments 1 and 0.

According to the plurality of implementations of the foregoing two methods, prediction can be performed on a channel of a terminal to obtain a corresponding prediction result.

According to the method for improving multi-user multiplexing performance provided in the foregoing embodiment, the network device configures the base sequence identifiers for the plurality of terminals by using the RRC signaling, where there is no orthogonal characteristic between the base sequences indicated by the base sequence identifiers of all the terminals; the terminal obtains the base sequence identifier that is configured by the network device by using the RRC signaling, and sends the sounding reference signal SRS based on the base sequence identifier; the network device performs SRS detection on the plurality of terminals based on the quasi-orthogonal sequence, to obtain the channel information for sending an SRS by each terminal, and performs channel prediction based on the channel information of each terminal, to obtain the channel prediction result. SRS configuration and detection based on the quasi-orthogonal sequence and channel prediction can effectively increase an average cell throughput and average user-perceived rate in a user movement scenario.

Based on the foregoing embodiment, during specific implementation of this solution, the network device may further obtain a motion status of each terminal based on a channel, at different SRS moments, of the terminal, where the motion status is used to indicate a magnitude of a moving speed of the terminal, and the motion status includes a quasi-stationary state, a low-speed moving state, or a medium/high-speed moving state; and then obtain a weight value of each terminal through calculation based on the channel prediction result of the terminal and the motion status of the terminal. The channel prediction result, of the terminal, predicted by the network device includes an SRS channel eigenvector or weight value.

A specific implementation is as follows: The network device determines a user movement status based on correlation between eigenvectors or weight values calculated for a channel at different SRS moments. Preferably, a correlation calculation result may be further processed in a time domain filtering or frequency domain filtering manner.

Preferably, weight value correlation is calculated based on the following formulas:

$$\rho_t = \sum_{s=0}^{S-1} |W_{t,i}^H * W_{t+1,i}| \tag{12}$$

$$\rho_t = \rho_{t-1} + \alpha \rho_t \tag{13}$$

Herein, S is a quantity of subcarriers of an SRS for frequency domain filtering, $\rho_t$ in (12) is a correlation value obtained through frequency domain filtering, $\rho_t$ in (13) is a correlation value obtained through time domain filtering, and a is a time domain filtering coefficient.

A user movement status is determined based on a calculated value of Pt. Different weight value calculation manners are selected based on different user movement statuses. Preferably, when $\rho_t \leq \gamma_0$, the weight value is calculated in a weight value calculation manner 0; when $\gamma_0 \leq \rho_t \leq \gamma_1$, the weight value is calculated in a weight value calculation manner 1; or when $\rho_t > \gamma_1$, the weight value is calculated in a weight value calculation manner 2. Herein, $\gamma_0 < \gamma_1$.

1. When $\rho_t \leq \gamma_0$, it may be considered that the terminal is in the quasi-stationary state. In this case, a weight value optimization idea is assuming that the weight value of the terminal is stable, and type-1 space domain and/or time domain filtering may be performed on the weight value of the terminal. In other words, if the motion status of the terminal is the quasi-stationary state, type-1 space domain and/or time domain filtering is performed on the SRS channel prediction vector or weight value of the terminal.

In an optional manner, least mean square filtering of the weight value is implemented based on a subspace distance and a gradient descent method. It is assumed that w(t) is a predicted weight value of an SRS moment for prediction, and v(t) is an actual weight value of the SRS moment for prediction. A subspace distance between the two weight values is used as an objective function:

$$\min f(w(t))=E\{\|v(t)v^H(t)-w(t)w^H(t)\|_F^2\}$$

$$w(t) \text{ s.t. } w^H(t)w(t)=1 \qquad (14)$$

Further, optionally:

$$w(t)=w(t-1)+\mu v(t-1)v^H(t-1)w(t-1) \qquad (15)$$

Herein, w(t) is a weight value obtained through filtering for a moment t, w(t−1) is a weight value obtained through filtering for a moment t−1, u is a gradient descent coefficient, and v(t−1) is a loss weight value at the moment t−1.

2. When $\gamma_0 \leq \rho_t \leq \gamma_1$, it may be considered that the terminal is in the low-speed moving state. In this case, a weight value optimization idea is assuming that there is correlation between weight values, at different moments, of the terminal, and type-2 space domain and/or time domain filtering may be performed on the weight value of the terminal. In other words, if the motion status of the terminal is the low-speed moving state, type-2 space domain and/or time domain filtering is performed on the SRS channel prediction vector or weight value of the terminal.

Optionally, filtering is performed based on a Kalman filtering prediction algorithm, including an enhanced algorithm type thereof.

Optionally, filtering is performed based on a normalized least mean square (NLMS) adaptive filtering prediction algorithm, including an enhanced algorithm type thereof.

Optionally, filtering is performed based on a recursive least square (RLS) prediction algorithm, including an enhanced algorithm type thereof.

Optionally, filtering is performed based on an autoregressive (AR) filtering prediction algorithm, including an enhanced algorithm type thereof.

Further, N historical SRS channel vectors or weight values are combined, and expressed in a matrix form:

$$X_n=[x_{n-N}, x_{n-N+2}, \ldots, x_{n-1}] \qquad (16)$$

Based on an autoregressive model, the prediction vector can be obtained by using the following formula:

$$y_n=X_n\alpha \qquad (17)$$

$$\alpha=[\alpha_1,\alpha_2,\ldots,\alpha_N]^T \qquad (18)$$

Because $X_n$ is a full-column-rank matrix, $\alpha$ can be obtained by using a left pseudo-inverse matrix of $X_n$:

$$\alpha_n=(X_n^H X_n)^{-1} X_n^H y_n \qquad (19)$$

Because a prediction value cannot be obtained in advance, an accurate value of $\alpha$ cannot be obtained. For a previous moment, $\alpha_{n-1}$ can be obtained, that is:

$$\alpha_{n-1}=(X_{n-1}^H X_{n-1})^{-1} X_{n-1}^H y_{n-1} \qquad (20)$$

A dimension of $X_n$ is $N \times N$, a dimension of $\alpha$ is $N \times 1$, and a dimension of $y_n$ is $N \times 1$.

Further, conventional AR cannot resolve a problem of phase jump at different SRS moments. Improvement is performed on conventional AR to change a prediction target from a weight value to a projected weight value of a basis formed by different moments. In such a projection manner, impact of phase jump can be eliminated. This case is as follows:

$$H=[v(t-1),v(t-2)v^H(t-2)v(t-1),\ldots,v(t-N)v^H(t-N)v(t-1)] \qquad (21)$$

$$H_1=[v(t-1),v(t-2)v^H(t-2)v(t-1),\ldots,v(t-N)v^H(t-N)v(t-1)] \qquad (22)$$

Therefore, a prediction moment v'(t) may be represented as follows:

$$v'(t)=H(H_1^H H_1)^{-1} H_1^H v(t-1)v^H(t-1)v(t-2) \qquad (23)$$

3. When $\rho_t > \gamma_1$, it may be considered that the terminal is in the medium/high-speed moving state. In this case, a weight value optimization idea is assuming that correlation between weight values, at different moments, of the terminal is relatively low, and second-moment calculation may be performed on the channel of the terminal to generate a weight value with a statistical characteristic. In other words, if the motion status of the terminal is the medium/high-speed moving state, second-moment calculation is performed on the channel of the terminal to generate the weight value of the terminal.

Optionally, statistical-weight calculation is performed in time domain. An SRS time-frequency resource includes a time domain resource and a frequency domain resource. Therefore, correspondingly, a statistical solution herein may be for a frequency-domain statistical weight or a time-domain statistical weight, or may be for a time-frequency two-dimensional statistical weight.

(1) Frequency-Domain Statistical Weight:

A statistical correlation matrix is obtained based on a channel coefficient corresponding to 1/S, at a closest SRS moment (considering full bandwidth), of the full SRS bandwidth. It can be ensured that the statistical weight obtained in this way is closest to a current moment in time. $N_{Sc}$ is an SRS subcarrier quantity about which statistics are collected in frequency domain, h(k) is a channel matrix or vector of the $k^{th}$ subcarrier, and $R_f$ represents a frequency-domain statistical autocorrelation matrix.

$$R_f = \frac{1}{N_{Sc}} \sum_{K=0}^{N_{Sc}-1} h(k)h^H(k) \qquad (24)$$

(2) Time-Domain Statistical Weight:

For a historical SRS moment (considering only a current band), averaging is first performed in frequency domain, and then alpha filtering is performed in time domain. A time domain alpha filtering period is S times a configured SRS period, a is a time domain filtering coefficient, and $R_t$ is a moment-t correlation matrix.

$$R_t=(1-\alpha)R_{t-1}+\alpha R_t \qquad (25)$$

(3) Time-Frequency Domain Statistical Weight:

The time-frequency domain statistical weight is a combination of the frequency-domain statistical weight and the time-domain statistical weight. For a historical SRS moment (considering full bandwidth), averaging is first performed in frequency domain, and then alpha filtering is performed in time domain. A time domain alpha filtering period is a configured SRS period. When a is 1, the time-frequency domain statistical weight becomes the frequency-domain statistical weight.

Optionally, multi-user (multi-user, MU) calculation methods of the terminal specifically include the following several methods.

(1) Regularized Enhanced Zero-Forcing (REZF) Algorithm:

For a baseline, MU weight value calculation is performed by using REZF:

$$W=H(H^H H+\delta^2 I)^{-1} \qquad (26)$$

Herein, H is a full-column-rank matrix into which SU weight values of a plurality of users are combined, and $\delta^2$ is a regularization coefficient. An REZF algorithm based on a statistical weight means replacing a baseline SU weight value with a weight value (an eigenvector corresponding to a maximum eigenvalue) that is obtained through singular value decomposition (SVD) of a statistical correlation matrix.

(2) Signal-to-Leakage-and-Noise Ratio (SLNR) Maximization Algorithm:

An SLNR algorithm criterion is to maximize signal power relative to signal power leaked to another cell and noise. In this way, a problem of leakage to a neighboring cell and a signal-to-noise ratio problem of a target user can be both considered for a weight value. A weight value generation constraint based on the SLNR criterion is as follows:

$$W_k^{(SLNR)} = \operatorname{argmax} \frac{P\|H_k W_k\|_F^2}{N_R \sigma_{n,k}^2 + \sum_{l=1,l\neq k}^{K} P\|H_l W_k\|_F^2} \quad (27)$$

Herein, $H_k$ is a frequency domain channel of the kth user, $W_k$ is a corresponding weight value, $N_R \sigma_{n,k}^2$ is white Gaussian noise, and $P\|\ \|_F^2$ represents power.

Therefore, an optimal weight value based on the SLNR criterion is as follows:

$$W_k = eigenvector\left(\left(\delta^2 J + \sum_{l=0,l\neq k}^{K-1} H_l H_l^H\right)^{-1} H_k H_k^H\right) \quad (28)$$

K is a quantity of users (a quantity of flows). When $H_l$ is $N_T \times 1$, the following can be obtained:

$$W_k = \left(\delta^2 I + \sum_{l=0,l\neq k}^{K-1} H_l H_l^H\right)^{-1} V_k \quad (29)$$

Herein, $V_k$ is an SU weight value of the kth user. The foregoing formula is an SLNR_W algorithm derived based on an instantaneous channel coefficient, and a statistical correlation matrix and a principal eigenvector obtained through SVD of the statistical correlation matrix are directly substituted into the foregoing formula to obtain the following:

$$W_k = \left(\delta^2 I + \sum_{l=0,l\neq k}^{K-1} R_l\right)^{-1} V_k \quad (30)$$

$V_k$ herein may be a principal eigenvector corresponding to a statistical covariance matrix $R_k$, or may be a principal eigenvector corresponding to an instantaneous covariance matrix. Using a statistical SU weight value can implement better filtering and reduce impact caused by mobility. Using an instantaneous SU weight value can overcome factors such as frequency selection, and better match an actual channel in a medium/low-speed scenario. Evaluation needs to be performed to determine SU weight values specifically used in different scenarios.

It can be learned herein that, in principle, the SLNR algorithm can better avoid leakage-caused interference to another user. Therefore, expected performance of the algorithm is relatively good. However, it can be learned that, for the SLNR algorithm, SVD or an inversion operation of a (2*m*n)×(2*m*n) large matrix needs to be performed, resulting in relatively high complexity, and difficulty of implementation in a product. Therefore, the following provides algorithm simplification.

Figure 11:
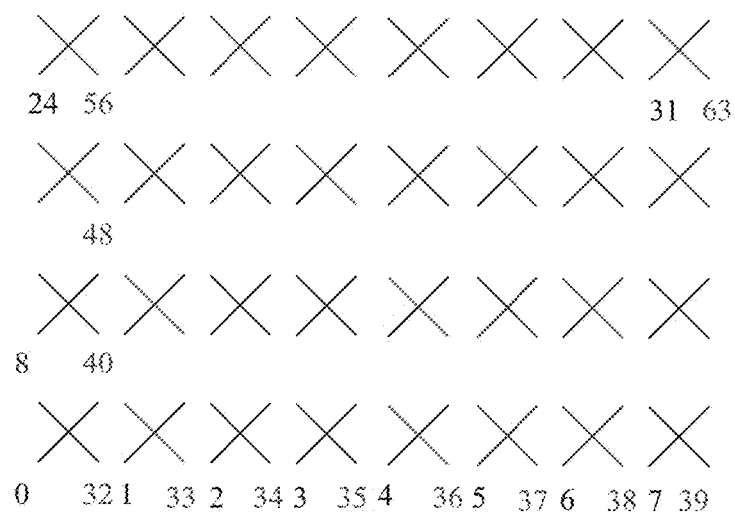
FIG. 11 is a schematic diagram of a base-station-side antenna location and polarization manner according to this application.

(3) Structured Statistical-Weight Algorithm:

Currently, a base-station-side antenna structure is HmVnPt, where m is a quantity of horizontal co-polarized elements in a same row of an antenna array, n is a quantity of vertical co-polarized elements in a same column of the antenna array, and t is a polarization quantity. FIG. 11 is a schematic diagram of a base-station-side antenna location and polarization manner according to this application. As shown in FIG. 11, M represents a quantity of rows, N represents a quantity of columns, and P represents a polarization quantity. It may be assumed that a statistical correlation matrix of a channel meets the following structure:

$$R = \begin{bmatrix} R_{V1} \otimes R_{H1} & 0 \\ 0 & R_{V2} \otimes R_{H2} \end{bmatrix} \quad (31)$$

Herein, $R_{v1}$, $R_{v2}$, $R_{H1}$, and $R_{H2}$ are respectively an n×n matrix, an n×n matrix, an m×m matrix, and an m×m matrix. $R_{v1}$ and $R_{H1}$ correspond to a polarization. $R_{v2}$ and $R_{H2}$ correspond to another polarization. A method for obtaining $R_{v1}$ is as follows: First, a correlation matrix of a column is obtained based on a channel coefficient corresponding to n vertical-dimension rows of the polarization, and then averaging is performed on a column correlation matrix corresponding to m columns. A method for obtaining $R_{H1}$ is as follows: First, a correlation matrix of a row is obtained based on a channel coefficient corresponding to m horizontal-dimension columns of the polarization, and then averaging is performed on a row correlation matrix corresponding to n rows. Methods for obtaining $R_{v2}$ and $R_{H2}$ are similar thereto. Expressed in such a block structure, a statistical correlation matrix can be solved by block. This avoids large-matrix SVD and inversion.

(4) EZF Structured Statistical-Weight Algorithm:

Currently, a base-station-side antenna structure is HmVnPt, which is similar to a statistical correlation matrix. Therefore, it may be assumed that an SU weight value (a single flow per user) of a channel meets the following structure:

$$V = \begin{bmatrix} V_{v1} \otimes V_{H1} \\ V_{v2} \otimes V_{H2} \end{bmatrix} \quad (32)$$

Herein, $V_{v1}$, $V_{v2}$, $V_{H1}$, and $V_{H2}$ are respectively an n×1 matrix, an n×1 matrix, an m×1 matrix, and an m×1 matrix. $V_{v1}$ and $V_{H1}$ correspond to a polarization. $V_{v2}$ and $V_{H2}$ correspond to another polarization. $V_{v1}$, $V_{v2}$, $V_{H1}$, and $V_{H2}$ are left eigenvectors corresponding to maximum eigenvalues of $R_{v1}$, $R_{v2}$, $R_{H1}$, and $R_{H2}$, respectively.

To improve performance, weight values corresponding to the two polarizations may be averaged. Averaging may be performed before SVD, or SVD may be performed before averaging. Performing averaging before SVD can reduce an SVD operation amount by half. A result of first performing SVD and then performing averaging is as follows:

$$V = \begin{bmatrix} (V_{v1} + V_{v2}) \otimes (V_{H1} + V_{H2}) \\ (V_{v1} + V_{v2}) \otimes (V_{H1} + V_{H2}) \end{bmatrix} \quad (33)$$

A result of first performing averaging and then performing SVD is as follows:

$$V = \begin{bmatrix} V_v \otimes V_H \\ V_v \otimes V_H \end{bmatrix} \quad (34)$$

Herein, $V_v$ is a principal eigenvector corresponding to $(R_{v1}+R_{v2})/2$, and $V_H$ is a principal eigenvector corresponding to $(R_{H1}+R_{H2})/2$.

(5) SLNR Algorithm:

An SLNR algorithm based on a structured statistical weight can be derived by using a structured statistical correlation matrix and a structured SU weight value.

A related property of a Kronecker product is used:

$$(A+B)\otimes(C+D)=A\otimes C+A\otimes D+B\otimes C+B\otimes D$$

$$(A \cdot B)\otimes(C \cdot D)=(A\otimes C)\cdot(B\otimes D) \quad (35)$$

The formula (30) is re-expressed as follows:

$$W_k = \left(\delta^2 I + \sum_{l=0,l\neq k}^{K-1}\begin{bmatrix} R_{lv1} \otimes R_{lH1} & 0 \\ 0 & R_{lv2} \otimes R_{lH2} \end{bmatrix}\right)^{-1} \begin{bmatrix} V_{kv1} \otimes V_{kH1} \\ V_{kv2} \otimes V_{kH2} \end{bmatrix} \quad (36)$$

Then, to simplify inversion, the foregoing formula is approximately modified as follows:

$$W_k = \left(\delta^2 I + \begin{bmatrix} \sum_{l=0,l\neq k}^{K-1} R_{lv1} \otimes \sum_{l=0,l\neq k}^{K-1} R_{lH1} & 0 \\ 0 & \sum_{l=0,l\neq k}^{K-1} R_{lv2} \otimes \sum_{l=0,l\neq k}^{K-1} R_{lH2} \end{bmatrix}\right)^{-1} \begin{bmatrix} V_{kv1} \otimes V_{kH1} \\ V_{kv2} \otimes V_{kH2} \end{bmatrix} \quad (37)$$

The following is obtained through simplification:

$$W_k = \begin{bmatrix} \left(\sum_{l=0,l\neq k}^{K-1} R_{lv1} + \delta^2 I\right) \otimes \left(\sum_{l=0,l\neq k}^{K-1} R_{lH1} + \delta^2 I\right) & 0 \\ 0 & \left(\sum_{l=0,l\neq k}^{K-1} R_{lv2} + \delta^2 I\right) \otimes \left(\sum_{l=0,l\neq k}^{K-1} R_{lH2} + \delta^2 I\right) \end{bmatrix} \quad (38)$$

Therefore, the following is finally obtained:

$$W_k = \begin{bmatrix} \left(\sum_{l=0,l\neq k}^{K-1} R_{lv1} + \delta^2 I\right)^{-1} V_{kv1} \otimes \left(\sum_{l=0,l\neq k}^{K-1} R_{lH1} + \delta^2 I\right)^{-1} V_{kH1} \\ \left(\sum_{l=0,l\neq k}^{K-1} R_{lv2} + \delta^2 I\right)^{-1} V_{kv2} \otimes \left(\sum_{l=0,l\neq k}^{K-1} R_{lH2} + \delta^2 I\right)^{-1} V_{kH2} \end{bmatrix} \quad (39)$$

Therefore, in a structured manner, inversion of a (2*m*n)×(2*m*n) large matrix can be reduced to inversion of m×m and n×n matrices. In addition, different polarization correlation matrices can be averaged, that is, $R'_{v1}=R'_{v2}=(R_{v1}+R_{v2})/2$ and $R'_{H1}=R'_{H2}=(R_{H1}+R_{H2})/2$. Therefore, $R_{vH1,k}=R_{vH2,k}$. In this way, a quantity of times of inversion is reduced, complexity is greatly reduced, and a product requirement is met.

Statistical $R_{lvi}$ and statistical $R_{lHi}$ herein theoretically meet a Toeplitz structure. Therefore, the matrices $R_{lvi}$ and $R_{lHi}$ can be Toeplitz in a diagonal averaging manner. In this way, the matrices are further compressed, thereby facilitating storage.

(6) TBT Statistical-Weight Algorithm:

For a TBT (Toeplitz-Block-Toeplitz) statistical weight, complexity of single calculation is reduced by mainly using some of properties of a statistical covariance matrix.

Figure 12:
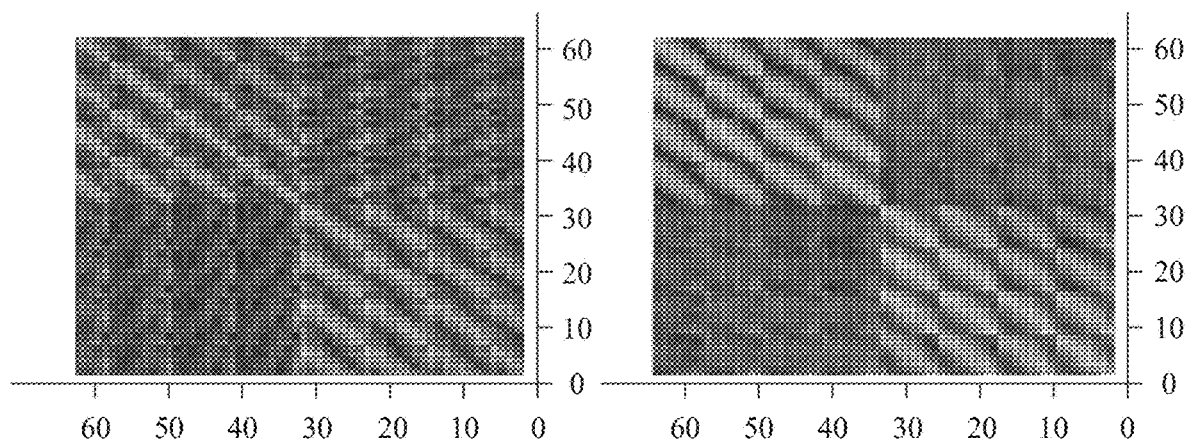
FIG. 12 is a schematic structural diagram of a statistical covariance matrix of TDD LTE outdoor channel sample collection according to this application.

First, it is assumed that an inter-polarization covariance matrix includes a relatively small amount of energy, and therefore, the inter-polarization covariance matrix is set to zeroes. FIG. 12 is a schematic structural diagram of a statistical covariance matrix of TDD LTE outdoor channel sample collection according to this application. As shown in FIG. 12, second, an intra-polarization covariance matrix is considered. It is assumed that, if a relative physical location distance between any two co-polarized elements on a URA antenna array is equal, statistical correlation between elements is also equal. Therefore, under this assumption, an intra-single-polarization statistical covariance matrix of a channel can be approximately expressed in a structure like that of a Toeplitz-Block-Toeplitz matrix. The matrix has two characteristics:

1. For each block (corresponding to a vertical ULA statistical covariance matrix) of the statistical covariance matrix, the matrix is a Toeplitz matrix.
2. For each block (corresponding to a horizontal ULA statistical covariance matrix) of the statistical covariance matrix, the matrix is a Toeplitz matrix.

Figure 13:
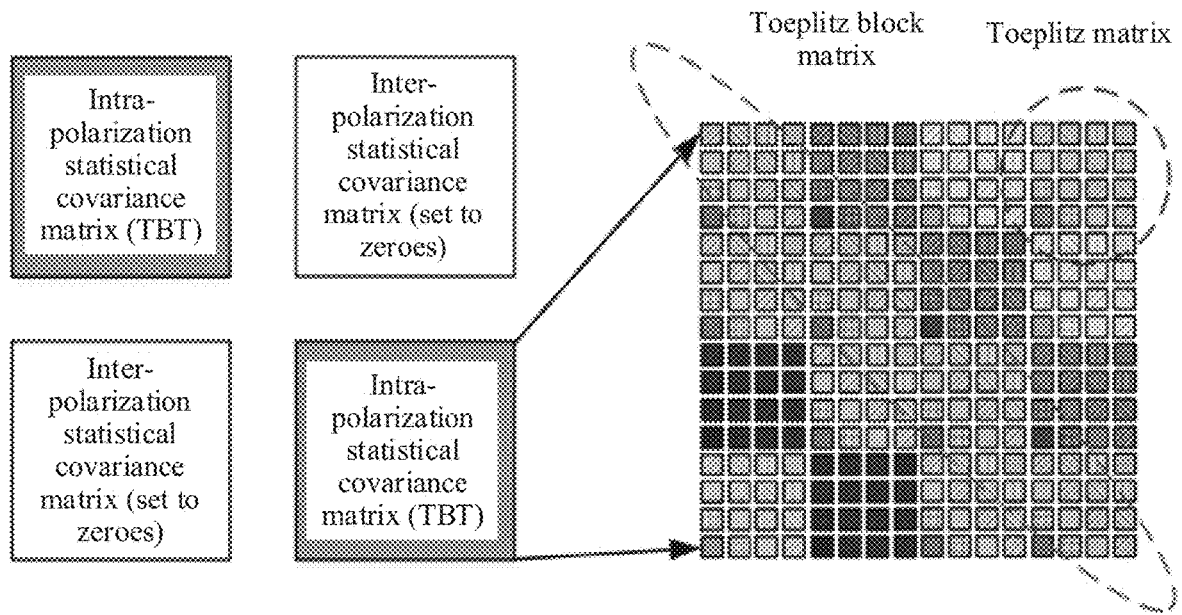
FIG. 13 is a schematic diagram of a TBT structure of a statistical covariance matrix according to this application.

FIG. 13 is a schematic diagram of a TBT structure of a statistical covariance matrix according to this application. Based on the foregoing two properties, finally, a statistical covariance matrix of a user may be approximately expressed in the structure shown in FIG. 13.

An inter-polarization statistical covariance matrix is set to zeroes, and an intra-polarization statistical covariance matrix meets a Toeplitz structure. An (m*n)×(m*n) matrix may be considered as an n*n block matrix that includes a vertical ULA statistical covariance matrix, where each block matrix is an m×m Toeplitz matrix and corresponds to a horizontal ULA statistical covariance matrix.

Figure 14:
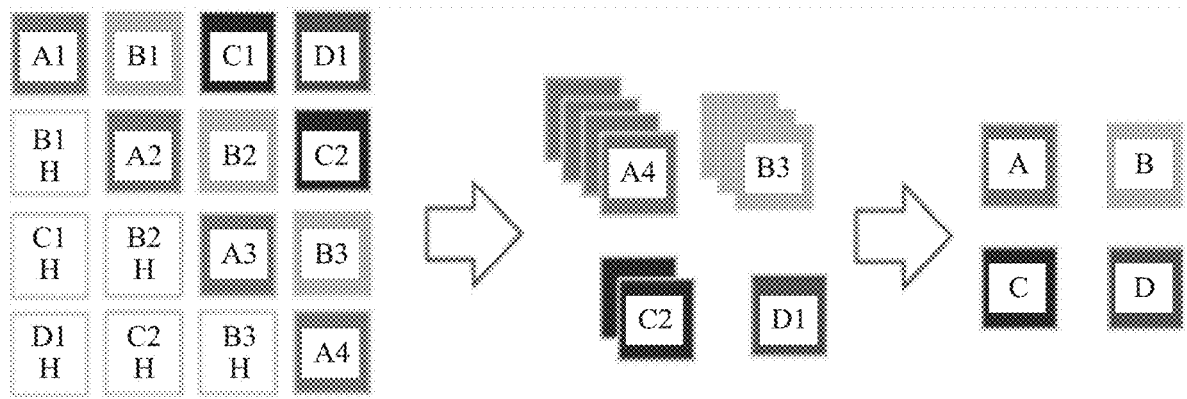
FIG. 14 is a schematic diagram of a Toeplitz block matrix compression approximation manner according to this application.

Based on the foregoing assumption, averaging is performed on an actual statistical covariance, and the covariance matrix is approximated to a TBT structure. A specific idea is as follows:

In the first step, Toeplitz (Toeplitz) block averaging is performed. FIG. 14 is a schematic diagram of a Toeplitz block matrix compression approximation manner according to this application. As shown in FIG. 14, for an (m*n)× (m*n) matrix of a polarization, all m×m matrix blocks that are approximately equal are first added and averaged;

because the matrix is conjugate symmetric, only blocks above a diagonal, as shown by blocks with same colors and same letters in FIG. 14, need to be averaged.

Figure 15:
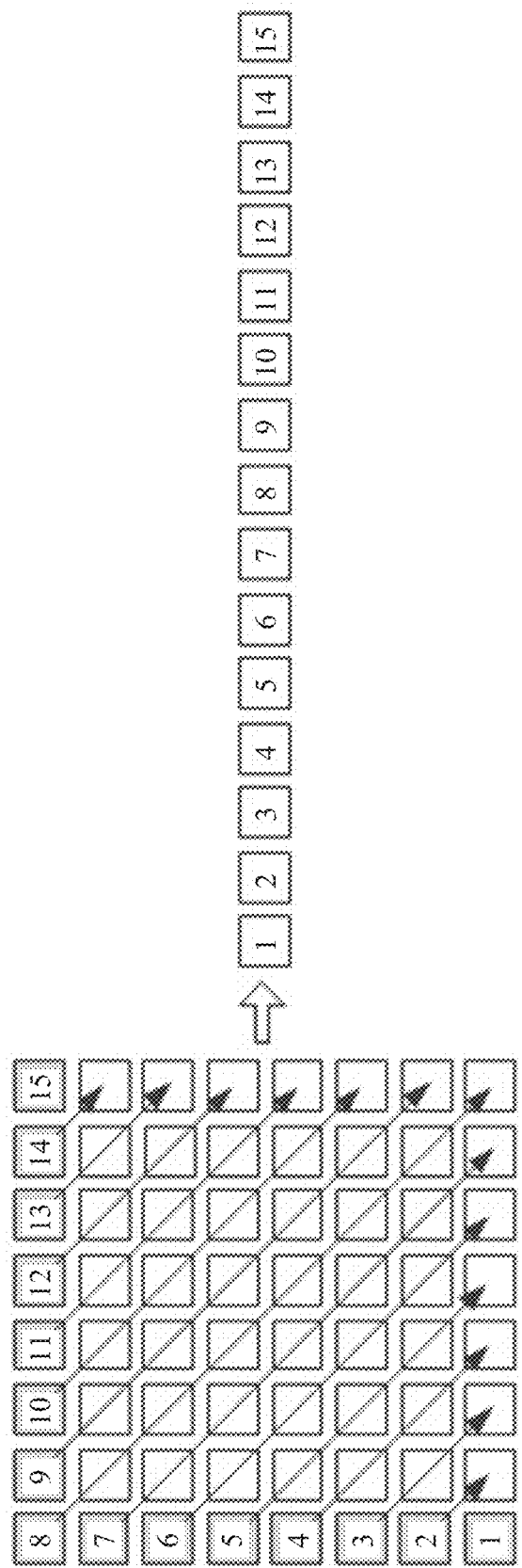
FIG. 15 is a schematic diagram of a Toeplitz matrix compression approximation manner according to this application.

In the second step, intra-block Toeplitz averaging is performed. FIG. 15 is a schematic diagram of a Toeplitz matrix compression approximation manner according to this application. For each block, elements that should be equal on each diagonal, as shown by blocks passed through by each line in FIG. 15, need to be added and averaged. Because each Toeplitz block (other than a block on a diagonal) is not necessarily a conjugate symmetric block, averages on all X diagonals need to be calculated to finally obtain an X-element vector.

Figure 16:
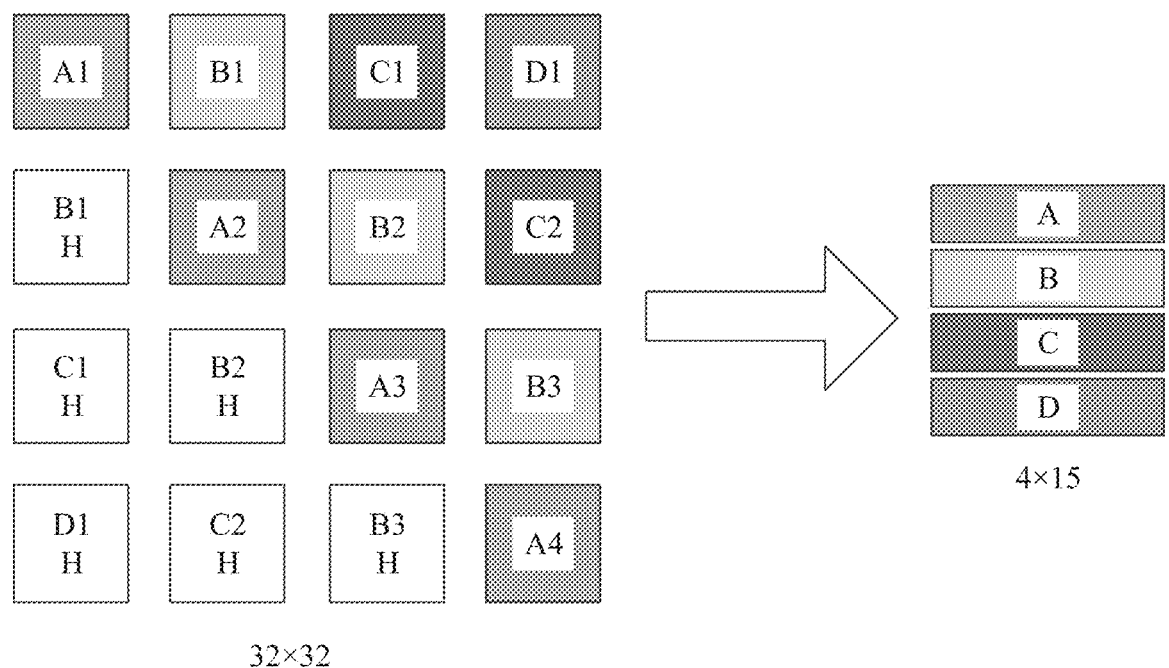
FIG. 16 is a schematic diagram of comparison between an uncompressed single-polarization TBT matrix and a compressed single-polarization TBT matrix according to this application.

In the third step, combination is performed to obtain a compressed matrix. FIG. 16 is a schematic diagram of comparison between an uncompressed single-polarization TBT matrix and a compressed single-polarization TBT matrix according to this application. After the first two steps are completed, each of n m×m matrices is compressed into an X-element vector, to finally form an n x X compressed matrix, as shown in FIG. 16. TBT approximation can greatly reduce storage overheads, and can also simplify matrix inversion by using a property of a Toeplitz matrix.

(7) TBT Matrix Inversion Simplification:

A TBT-form statistical covariance matrix sum is as follows:

$$R_{p,m} = \begin{bmatrix} R_0 & R_1 & \cdots & R_{m-1} \\ R_1^H & R_0 & \cdots & \vdots \\ \vdots & \vdots & \ddots & R_1 \\ R_{m-1}^H & R_{m-2}^H & R_1^H & R_0 \end{bmatrix} \quad (40)$$

An objective is to solve $R_{p,m}^{-1}$.

1. $R_{p,1}^{-1} = R_0^{-1}$ is calculated (where a dimension is p×p).
2. $\alpha_1 = R_0 - R_1^H R_{p,1} R_1$ is calculated (where a dimension is p×p).
3. $W_1 = R_0^{-1} R_1$ is calculated (where a dimension is p×p).
4. For i=1:m−1
5. $\beta_i = W_i^T J_{i \times p} \overline{R}_i + J_p R_{i+1}$ is calculated (where a dimension is p×p), where $J_i$ is an i×i anti-diagonal identity matrix, and $\overline{R}_i = [R_i \ldots R_1]^T$.
6. $\alpha_{i+1} = \alpha_i - \beta_i^H (\alpha_i^{-1})^T \beta_i$ is calculated (where a dimension is p×p).
7.

$$W_{i+1} = J_{(i+1) \times p} \left\{ \begin{bmatrix} J_{i \times p} W_i \\ 0 \end{bmatrix} - \begin{bmatrix} conj(W_i) \\ I \end{bmatrix} \right\} (a_i^{-1})^T \beta_i$$

is calculated (where a dimension is (i+1)p×p).

8. End for
9. $(R_{p,1}^{-1})_{i,j}$ is used to represent the (i,j)$^{th}$ block submatrix of $R_{p,1}^{-1}$, and the following is calculated:

$$[(R_{p,m}^{-1})_{1,1} \ldots (R_{p,m}^{-1})_{1,m-1}] = [J_p (a_{m-1}^{-1})^T J_p J_p (a_{m-1}^{-1})^T (J_{(m-1) \times p} W_{m-1})^T] \quad (41)$$

10. For any combination of (i,j) within intervals $$i \in \left[1, \frac{m}{2} - 1\right]$$

and j ∈ [i, m−i−1]:

$$(R_{p,m}^{-1})_{i+1,j+1} = (R_{p,m}^{-1})_{i,j} + (J_{(m-1) \times p} conj(W_{m-1}) (a_{m-1}^{-1})^T W_{m-1}^T J_{(m-1) \times p} - W_{m-1} a_{m-1}^{-1} W_{m-1}^H)_{i,j} \quad (42)$$

11. A right-side triangle part of $R_{p,m}^{-1}$ is added by using an existing block based on an anti-diagonal symmetry characteristic of $R_{p,m}^{-1}$.
12. A lower left part of Rpm is added by using an existing block based on a leading-diagonal conjugate symmetry characteristic of $R_{p,m}^{-1}$.

In the foregoing manner, the network device performs SRS configuration and detection based on the quasi-orthogonal sequence, SRS channel prediction based on frequency domain extrapolation, SRS channel prediction based on time-frequency-space two-dimensional inter-calibration, determining of a user movement status and prediction accuracy, and calculation of an adaptive user weight value. This can effectively increase an average cell throughput and average user-perceived rate in a user movement scenario.

Figure 17:
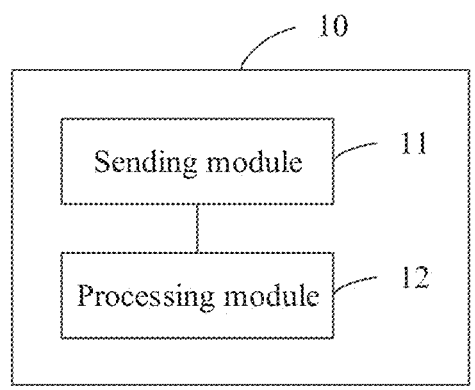
FIG. 17 is a schematic structural diagram of a first embodiment of an apparatus for improving multi-user multiplexing performance according to this application.

FIG. 17 is a schematic structural diagram of a first embodiment of an apparatus 10 for improving multi-user multiplexing performance according to this application. As shown in FIG. 17, the apparatus 10 for improving multi-user multiplexing performance includes:

a sending module 11, configured to configure base sequence identifiers for a plurality of terminals by using RRC signaling, where there is no orthogonal characteristic between base sequences indicated by the base sequence identifiers of all the terminals; and a processing module 12, configured to perform SRS detection on the plurality of terminals based on a quasi-orthogonal sequence, to obtain channel information for sending an SRS by each terminal.

The processing module 12 is further configured to perform channel prediction based on the channel information of each terminal, to obtain a channel prediction result.

The apparatus for improving multi-user multiplexing performance provided in this embodiment is configured to execute the network-device-side technical solution in any one of the foregoing method embodiments. Their implementation principles and technical effects are similar. Details are not described herein again.

In a specific implementation of the apparatus 10 for improving multi-user multiplexing performance, the processing module 12 is further configured to:

obtain a motion status of each terminal based on a channel, at different SRS moments, of the terminal, where the motion status is used to indicate a magnitude of a moving speed of the terminal, and the motion status includes a quasi-stationary state, a low-speed moving state, or a medium/high-speed moving state; and obtain a weight value of each terminal through calculation based on the channel prediction result of the terminal and the motion status of the terminal.

Further, the channel prediction result of the terminal includes an SRS channel eigenvector or weight value, and the processing module 12 is specifically configured to:

if the motion status of the terminal is the quasi-stationary state, perform type-1 space domain and/or time domain filtering on the SRS channel prediction vector or weight value of the terminal;

if the motion status of the terminal is the low-speed moving state, perform type-2 space domain and/or time domain filtering on the SRS channel prediction vector or weight value of the terminal; or if the motion status of the terminal is the medium/high-speed moving state, perform second-moment calculation on the channel of the terminal to generate the weight value of the terminal.

Optionally, the processing module 12 is specifically configured to:
perform least mean square filtering on an SRS prediction weight value of the terminal based on a subspace distance and a gradient descent method.

Optionally, the processing module 12 is specifically configured to:
perform filtering on the SRS channel prediction vector or weight value of the terminal based on a Kalman filtering prediction algorithm;
perform filtering on the SRS channel prediction vector or weight value of the terminal based on a normalized least mean square adaptive filtering prediction algorithm; or
perform filtering on the SRS channel prediction vector or weight value of the terminal based on a recursive least square RLS prediction algorithm.

In a specific implementation, the processing module 12 is specifically configured to:
preprocess a received to-be-processed frequency domain signal that is at an SRS location, and obtain, based on the preprocessed frequency domain signal, the channel information for sending the SRS by each terminal.

The preprocessing includes at least one of the following processing:
performing, according to a formula (1) $\tilde{y}(n)=w(n)*y(n)$, frequency domain filtering on the received to-be-processed frequency domain signal that is at the SRS location, where $y(n)$ is the frequency domain signal at the reference signal location, $w(n)$ is a frequency domain window coefficient, $\tilde{y}(n)$ is a signal obtained through the frequency domain filtering, $n=0, \ldots, N$ is a channel estimation location index, and N is a channel estimation length;
performing, according to a formula (2) $\tilde{y}=w*y$, frequency domain filtering on the received to-be-processed frequency domain signal that is at the SRS location, where y is the frequency domain signal at the reference signal location, whose dimension is N×1; w is a frequency domain window coefficient whose dimension is N×N; $\tilde{y}$ is a signal obtained through the frequency domain filtering, whose dimension is N×1; and N is a channel estimation length; or
performing, according to a formula (3) $\tilde{y}=\mathcal{F}(y)$, time domain interference cancellation on the received to-be-processed frequency domain signal that is at the SRS location, where y is the to-be-processed frequency domain signal at the reference signal location, whose dimension is N×1; $\mathcal{F}(\ )$ is a time domain cancellation transform function; y is a frequency domain signal obtained through the time domain cancellation, whose dimension is N×1; and N is a channel estimation length.

Optionally, the channel information of each terminal includes an SRS frequency domain channel estimation result of some subbands, and the processing module 12 is further specifically configured to:
predicting full SRS bandwidth based on the SRS frequency domain channel estimation result of the some subbands of each terminal and a frequency domain extrapolation manner, to obtain the channel prediction result of the terminal.

Optionally, the processing module 12 is further specifically configured to:
perform channel prediction on an SRS based on the channel information of each terminal and time-frequency-space two-dimensional inter-calibration, to obtain the channel prediction result of the terminal.

Optionally, the sending module 11 is specifically configured to:
send first RRC signaling to each terminal, where the first RRC signaling carries at least one base sequence identifier; and
when a terminal needs to change an SRS base sequence, send second RRC signaling to the terminal, where the second RRC signaling carries an index identifier, and the index identifier is used to indicate the terminal to send an SRS by using a first base sequence identifier in the at least one base sequence identifier.

Optionally, the sending module 11 is specifically configured to:
send first RRC signaling to each terminal, where the first RRC signaling carries one base sequence identifier, and the base sequence identifier indicates a candidate set of all SRS base sequence identifiers.

The apparatus for improving multi-user multiplexing performance provided in any one of the foregoing embodiments is configured to execute the network-device-side technical solution in the foregoing method embodiments. Their implementation principles and technical effects are similar. Details are not described herein again.

Figure 18:
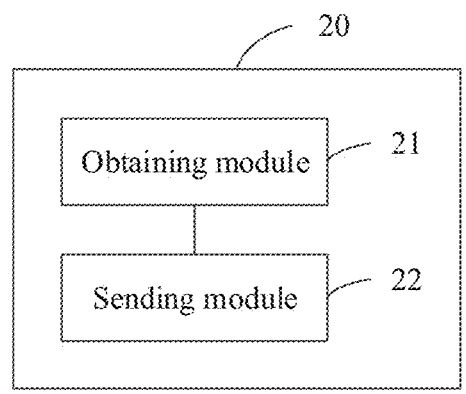
FIG. 18 is a schematic structural diagram of a second embodiment of an apparatus for improving multi-user multiplexing performance according to this application.

FIG. 18 is a schematic structural diagram of a second embodiment of an apparatus 20 for improving multi-user multiplexing performance according to this application. As shown in FIG. 18, the apparatus 20 for improving multi-user multiplexing performance includes:
an obtaining module 21, configured to obtain a base sequence identifier that is configured by a network device by using RRC signaling, where there is no orthogonality between a base sequence indicated by the base sequence identifier and a base sequence used by another terminal; and
a sending module 22, configured to send a sounding reference signal SRS based on the base sequence identifier.

Optionally, the obtaining module 21 is specifically configured to:
receive first RRC signaling sent by the network device, where the first RRC signaling carries at least one base sequence identifier;
receive second RRC signaling sent by the network device, where the second RRC signaling carries an index identifier; and
determine, based on the index identifier, to send the SRS by using a first base sequence identifier in the at least one base sequence identifier; or
receive first RRC signaling sent by the network device, where the first RRC signaling carries one base sequence identifier.

The apparatus for improving multi-user multiplexing performance provided in any one of the foregoing embodiments is configured to execute the terminal-side technical solution in the foregoing method embodiments. Their implementation principles and technical effects are similar. Details are not described herein again.

This application further provides a network device, including a processor, a memory, a receiver, and a transmitter. The memory is configured to store a program and data. The processor invokes the program stored in the memory, to execute the technical solution of the method for improving multi-user multiplexing performance provided in any one of the foregoing embodiments.

This application further provides a terminal, including a processor, a memory, a receiver, and a transmitter. The memory is configured to store a program and data. The processor invokes the program stored in the memory, to execute the terminal-side technical solution of the method for improving multi-user multiplexing performance in any one of the foregoing embodiments.

During implementation of the foregoing network device and terminal, the memory and the processor are electrically connected to each other directly or indirectly, to implement data transmission or exchange. For example, these elements may be electrically connected to each other by using one or more communications buses or signal lines, for example, may be connected by using a bus. The memory stores computer executable instructions for implementing a data access control method, including at least one software function module that can be stored in the memory in a form of software or firmware. The processor executes various function applications and data processing by running the software program and module stored in the memory.

The memory may be but is not limited to a random access memory (RAM), a read-only memory (ROM), a programmable read-only memory (PROM), an erasable programmable read-only memory (EPROM), an electrically erasable read-only memory (EEPROM), and the like. The memory is configured to store the program, and the processor executes the program after receiving an execution instruction. Further, the software program and module in the memory may further include an operating system. The operating system may include various software components and/or drivers used for system task management (for example, memory management, storage device control, and power management), and may communicate with various hardware or software components to provide a running environment of other software components.

The processor may be an integrated circuit chip and has a signal processing capability. The foregoing processor may be a general-purpose processor, including a central processing unit (CPU), a network processor (NP), or the like. The processor may implement or perform the methods, the steps, and logical block diagrams that are disclosed in the embodiments of this application. The general-purpose processor may be a microprocessor, or the processor may be any conventional processor or the like.

This application further provides a computer-readable storage medium. The computer-readable storage medium includes a program. When executed by a processor, the program is configured to execute the network-device-side technical solution of the method for improving multi-user multiplexing performance in any one of the foregoing method embodiments.

This application further provides a computer-readable storage medium. The computer-readable storage medium includes a program. When executed by a processor, the program is configured to execute the terminal-side technical solution of the method for improving multi-user multiplexing performance in any one of the method embodiments.

This application further provides a program product. The program product includes a computer program. The computer program is stored in a readable storage medium. At least one processor of a network device is capable of reading the computer program from the readable storage medium. The at least one processor executes the computer program, to enable the network device to implement the technical solution in any one of the foregoing method embodiments.

This application further provides a program product. The program product includes a computer program. The computer program is stored in a readable storage medium. At least one processor of a terminal is capable of reading the computer program from the readable storage medium. The at least one processor executes the computer program, to enable the terminal to implement the technical solution in any one of the foregoing method embodiments.

This application further provides a chip. The chip is capable of being applied to a network device. The chip includes at least one communications interface, at least one processor, and at least one memory. The communications interface, the memory, and the processor are interconnected by using a bus. The processor invokes a computer program stored in the memory, to execute the network-device-side technical solution in any one of the foregoing method embodiments.

This application further provides a chip. The chip is capable of being applied to a terminal. The chip includes at least one communications interface, at least one processor, and at least one memory. The communications interface, the memory, and the processor are interconnected by using a bus. The processor invokes a computer program stored in the memory, to execute the terminal-side technical solution in any one of the foregoing method embodiments.

A person of ordinary skill in the art should understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc. A specific medium type is not limited in this application.

What is claimed is:

1. A method for improving multi-user multiplexing performance, wherein the method is applied to a network device, and comprises:

configuring base sequence identifiers for a plurality of terminals by using radio resource control (RRC) signaling, wherein there is no orthogonality between base sequences indicated by the base sequence identifiers of the plurality of terminals;

performing sounding reference signal (SRS) detection on the plurality of terminals based on a quasi-orthogonal sequence, to obtain channel information for sending an SRS by each terminal, wherein performing the SRS detection on the plurality of terminals based on the quasi-orthogonal sequence, to obtain the channel information for sending the SRS by each terminal comprises calculating a respective cross-correlation sequence for each pair of base sequences of the base sequences, and wherein the performing SRS detection on the plurality of terminals based on a quasi-orthogonal sequence, to obtain channel information for sending an SRS by each terminal comprises: preprocessing a received to-be-processed frequency domain signal that is at an SRS location, wherein the preprocessing comprises at least one of the following processing:

performing, according to a formula (1) $\tilde{y}(n)=w(n)*y(n)$, frequency domain filtering on the received to-be-processed frequency domain signal that is at the SRS location, wherein y(n) is the received to-be-processed frequency domain signal at the SRS location, w(n) is a frequency domain window coefficient, $\tilde{y}(n)$ is a signal obtained through the frequency domain filtering, n=0, ..., N is a channel estimation location index, and N is a channel estimation length; or performing, according to a formula (2) $\tilde{y}=w*y$, frequency domain filtering on the received to-be-processed frequency domain signal that is at the SRS location, wherein y is the received to-be-processed frequency domain signal at the SRS location, whose dimension is N×1; w is a frequency domain window coefficient whose dimension is N×N; ỹ is a signal obtained through the frequency domain filtering, whose dimension is N×1; and N is a channel estimation length; and performing channel prediction based on the channel information of each terminal, to obtain a channel prediction result of each terminal.

2. The method according to claim 1, wherein the method further comprises:

obtaining a motion status of each terminal based on a channel, at different SRS moments, of the terminal, wherein the motion status indicates a magnitude of a moving speed of the terminal, and wherein the motion status comprises a quasi-stationary state, a low-speed moving state, or a medium/high-speed moving state; and obtaining a weight value of each terminal through calculation based on the channel prediction result of the terminal and the motion status of the terminal.

3. The method according to claim 2, wherein the channel prediction result of the terminal comprises an SRS channel eigenvector or a channel weight value, and wherein the obtaining a weight value of each terminal through calculation based on the channel prediction result of the terminal and the motion status of the terminal comprises:

in response to determining that the motion status of the terminal is a first state, performing at least one of type-1 space domain or time domain filtering on an SRS channel prediction vector or a prediction weight value of the terminal;

in response to determining that the motion status of the terminal is a second state, performing at least one of type-2 space domain or time domain filtering on the SRS channel prediction vector or the prediction weight value of the terminal; or in response to determining that the motion status of the terminal is a third state, performing second-moment calculation on the channel of the terminal to generate the weight value of the terminal.

4. The method according to claim 3, wherein the performing at least one of type-1 space domain or time domain filtering on an SRS channel prediction vector or a prediction weight value of the terminal comprises:

performing least mean square filtering on an SRS prediction weight value of the terminal based on a subspace distance and a gradient descent method.

5. The method according to claim 3, wherein the performing at least one of type-2 space domain or time domain filtering on the SRS channel prediction vector or the prediction weight value of the terminal comprises:

performing filtering on the SRS channel prediction vector or the prediction weight value of the terminal based on a Kalman filtering prediction algorithm;

performing filtering on the SRS channel prediction vector or the prediction weight value of the terminal based on a normalized least mean square adaptive filtering prediction algorithm;

performing filtering on the SRS channel prediction vector or the prediction weight value of the terminal based on a recursive least square (RLS) prediction algorithm; or performing filtering on the SRS channel prediction vector or the prediction weight value of the terminal based on an autoregressive (AR) filtering prediction algorithm.

6. An apparatus, comprising:

at least one processor, and a non-transitory memory storing instructions for execution by the at least one processor;

wherein, when executed, the instructions cause the apparatus to perform operations comprising:

configuring base sequence identifiers for a plurality of terminals by using radio resource control (RRC) signaling, wherein there is no orthogonality between base sequences indicated by the base sequence identifiers of the plurality of terminals;

performing sounding reference signal (SRS) detection on the plurality of terminals based on a quasi-orthogonal sequence, to obtain channel information for sending an SRS by each terminal, wherein performing the SRS detection on the plurality of terminals based on the quasi-orthogonal sequence, to obtain the channel information for sending the SRS by each terminal comprises calculating a respective cross-correlation sequence for each pair of base sequences of the base sequences, and wherein the performing SRS detection on the plurality of terminals based on a quasi-orthogonal sequence, to obtain channel information for sending an SRS by each terminal comprises: preprocessing a received to-be-processed frequency domain signal that is at an SRS location, wherein the preprocessing comprises at least one of the following processing:

performing, according to a formula (1) ỹ(n)=w(n)*y(n), frequency domain filtering on the received to-be-processed frequency domain signal that is at the SRS location, wherein y(n) is the received to-be-processed frequency domain signal at the SRS location, w(n) is a frequency domain window coefficient, ỹ(n) is a signal obtained through the frequency domain filtering, n=0, ... , N is a channel estimation location index, and N is a channel estimation length; or performing, according to a formula (2) ỹ=w*y, frequency domain filtering on the received to-be-processed frequency domain signal that is at the SRS location, wherein y is the received to-be-processed frequency domain signal at the SRS location, whose dimension is N×1; w is a frequency domain window coefficient whose dimension is N×N; ỹ is a signal obtained through the frequency domain filtering, whose dimension is N×1; and N is a channel estimation length; and performing channel prediction based on the channel information of each terminal, to obtain a channel prediction result of each terminal.

7. The apparatus according to claim 6, wherein the operations further comprise:

obtaining a motion status of each terminal based on a channel, at different SRS moments, of the terminal, wherein the motion status indicates a magnitude of a moving speed of the terminal, and wherein the motion status comprises a quasi-stationary state, a low-speed moving state, or a medium/high-speed moving state; and obtaining a weight value of each terminal through calculation based on the channel prediction result of the terminal and the motion status of the terminal.

8. The apparatus according to claim 7, wherein the channel prediction result of the terminal comprises an SRS channel eigenvector or a channel weight value, and wherein the obtaining a weight value of each terminal through calculation based on the channel prediction result of the terminal and the motion status of the terminal comprises:

in response to determining that the motion status of the terminal is a first state, performing at least one of type-1 space domain or time domain filtering on an SRS channel prediction vector or a prediction weight value of the terminal;

in response to determining that the motion status of the terminal is a second state, performing at least one of type-2 space domain or time domain filtering on the SRS channel prediction vector or the prediction weight value of the terminal; or in response to determining that the motion status of the terminal is a third state, performing second-moment calculation on the channel of the terminal to generate the weight value of the terminal.

9. The apparatus according to claim 8, wherein the performing at least one of type-1 space domain or time domain filtering on an SRS channel prediction vector or a prediction weight value of the terminal comprises:

performing least mean square filtering on an SRS prediction weight value of the terminal based on a subspace distance and a gradient descent method.

10. The apparatus according to claim 8, wherein the performing at least one of type-2 space domain or time domain filtering on the SRS channel prediction vector or the prediction weight value of the terminal comprises:

performing filtering on the SRS channel prediction vector or the prediction weight value of the terminal based on a Kalman filtering prediction algorithm;

performing filtering on the SRS channel prediction vector or the prediction weight value of the terminal based on a normalized least mean square adaptive filtering prediction algorithm;

performing filtering on the SRS channel prediction vector or the prediction weight value of the terminal based on a recursive least square (RLS) prediction algorithm; or performing filtering on the SRS channel prediction vector or the prediction weight value of the terminal based on an autoregressive (AR) filtering prediction algorithm.

11. A non-transitory memory storage medium comprising computer-executable instructions that, when executed, cause a first radio access network node to perform operations comprising:

configuring base sequence identifiers for a plurality of terminals by using radio resource control (RRC) signaling, wherein there is no orthogonality between base sequences indicated by the base sequence identifiers of the plurality of terminals;

performing sounding reference signal (SRS) detection on the plurality of terminals based on a quasi-orthogonal sequence, to obtain channel information for sending an SRS by each terminal, wherein performing the SRS detection on the plurality of terminals based on the quasi-orthogonal sequence, to obtain the channel information for sending the SRS by each terminal comprises calculating a respective cross-correlation sequence for each pair of base sequences of the base sequences, and wherein the performing SRS detection on the plurality of terminals based on a quasi-orthogonal sequence, to obtain channel information for sending an SRS by each terminal comprises: preprocessing a received to-be-processed frequency domain signal that is at an SRS location, wherein the preprocessing comprises at least one of the following processing:

performing, according to a formula (1) $\tilde{y}(n)=w(n)*y(n)$, frequency domain filtering on the received to-be-processed frequency domain signal that is at the SRS location, wherein y(n) is the received to-be-processed frequency domain signal at the SRS location, w(n) is a frequency domain window coefficient, $\tilde{y}(n)$ is a signal obtained through the frequency domain filtering, n=0, . . . , N is a channel estimation location index, and N is a channel estimation length: or performing, according to a formula (2) $\tilde{y}=w*y$, frequency domain filtering on the received to-be-processed frequency domain signal that is at the SRS location, wherein y is the received to-be-processed frequency domain signal at the SRS location, whose dimension is N×1; w is a frequency domain window coefficient whose dimension is N×N; $\tilde{y}$ is a signal obtained through the frequency domain filtering, whose dimension is N×1; and N is a channel estimation length; and performing channel prediction based on the channel information of each terminal, to obtain a channel prediction result of each terminal.

12. The non-transitory memory storage medium according to claim 11, wherein the operations further comprise:

obtaining a motion status of each terminal based on a channel, at different SRS moments, of the terminal, wherein the motion status indicates a magnitude of a moving speed of the terminal, and wherein the motion status comprises a quasi-stationary state, a low-speed moving state, or a medium/high-speed moving state; and obtaining a weight value of each terminal through calculation based on the channel prediction result of the terminal and the motion status of the terminal.

13. The non-transitory memory storage medium according to claim 12, wherein the channel prediction result of the terminal comprises an SRS channel eigenvector or a channel weight value, and wherein the obtaining a weight value of each terminal through calculation based on the channel prediction result of the terminal and the motion status of the terminal comprises:

in response to determining that the motion status of the terminal is a first state, performing at least one of type-1 space domain or time domain filtering on an SRS channel prediction vector or a prediction weight value of the terminal;

in response to determining that the motion status of the terminal is a second state, performing at least one of type-2 space domain or time domain filtering on the SRS channel prediction vector or the prediction weight value of the terminal; or in response to determining that the motion status of the terminal is a third state, performing second-moment calculation on the channel of the terminal to generate the weight value of the terminal.

14. The non-transitory memory storage medium according to claim 13, wherein the performing at least one of type-1 space domain or time domain filtering on an SRS channel prediction vector or a prediction weight value of the terminal comprises:

performing least mean square filtering on an SRS prediction weight value of the terminal based on a subspace distance and a gradient descent method.

15. The non-transitory memory storage medium according to claim 13, wherein the performing at least one of type-2 space domain or time domain filtering on the SRS channel prediction vector or the prediction weight value of the terminal comprises:

performing filtering on the SRS channel prediction vector or the prediction weight value of the terminal based on a Kalman filtering prediction algorithm;

performing filtering on the SRS channel prediction vector or the prediction weight value of the terminal based on a normalized least mean square adaptive filtering prediction algorithm;
performing filtering on the SRS channel prediction vector or the prediction weight value of the terminal based on a recursive least square (RLS) prediction algorithm; or
performing filtering on the SRS channel prediction vector or the prediction weight value of the terminal based on an autoregressive (AR) filtering prediction algorithm.

* * * * *

UNITED STATES PATENT AND TRADEMARK OFFICE
CERTIFICATE OF CORRECTION

PATENT NO. : 12,101,205 B2
APPLICATION NO. : 17/513666
DATED : September 24, 2024
INVENTOR(S) : Senbao Guo et al.

Page 1 of 1

It is certified that error appears in the above-identified patent and that said Letters Patent is hereby corrected as shown below:

In the Claims

In Column 36, In Line 5, In Claim 11, delete "length:" and insert -- length; --.

Signed and Sealed this
Fourth Day of February, 2025

Coke Morgan Stewart
*Acting Director of the United States Patent and Trademark Office*